(12) United States Patent
Timmis et al.

(10) Patent No.: US 12,441,864 B2
(45) Date of Patent: Oct. 14, 2025

(54) INTEGRATED PAC-BASED CAP DELIVERY SYSTEM, APPARATUS AND COMPOSITIONS

(71) Applicant: J.F. Brennan Company, Inc., La Crosse, WI (US)

(72) Inventors: Andrew Timmis, Pembroke, MA (US); Greg Smith, La Crosse, WI (US); Tyler Lee, Houston, MN (US); Sam Crawford, Denmark, WI (US); Dustin Bauman, Holmen, WI (US)

(73) Assignee: J.F. Brennan Company, Inc., La Crosse, WI (US)

( * ) Notice: Subject to any disclaimer, the term of this patent is extended or adjusted under 35 U.S.C. 154(b) by 131 days.

(21) Appl. No.: 18/406,023

(22) Filed: Jan. 5, 2024

(65) Prior Publication Data
US 2024/0229406 A1 Jul. 11, 2024

Related U.S. Application Data

(60) Provisional application No. 63/478,934, filed on Jan. 7, 2023.

(51) Int. Cl.
*B09B 1/00* (2006.01)
*B01F 23/53* (2022.01)
(Continued)

(52) U.S. Cl.
CPC ............. *C08K 3/04* (2013.01); *B01F 23/53* (2022.01); *B01F 23/69* (2022.01); *B01F 27/724* (2022.01);
(Continued)

(58) Field of Classification Search
CPC .......... E02B 3/121; E02B 3/128; E02D 15/06
See application file for complete search history.

(56) References Cited

U.S. PATENT DOCUMENTS

| 5,005,980 A | 4/1991 | Zimmerman |
| 5,127,765 A * | 7/1992 | Millgard .................. B09C 1/00 405/266 |

(Continued)

FOREIGN PATENT DOCUMENTS

| CZ | 2001833 A3 | 1/2002 | |
| WO | WO-2007060275 A2 * | 5/2007 | ............. B63B 35/00 |

OTHER PUBLICATIONS

EPA, "Inert Reassessment Document for Hydroxypropyl Guar Gum," EPA Case No. 39421-75-5 (2005).

(Continued)

*Primary Examiner* — Kyle Armstrong
(74) *Attorney, Agent, or Firm* — Duane C. Blake, Esq.

(57) ABSTRACT

Disclosed are novel solutions in which a preexisting sediment capping system is integrated with improvements such as a cap ingredient processing and delivery apparatus, cap processing method and novel compositional cap product, whereby a hazardous site is remediated by delivering at least one novel cap composition layer over the contaminated subaqueous waterway or terrestrial substrate floor. One embodiment includes a powdered activated carbon ("PAC") based cap layer produced by the system and methodology disclosed, the cap layer ingredients comprising predetermined ratio amounts of dry PAC and dry powdered 2-Hydroxypropyl guar gum ("HGG") used as a safe and effective delivery ingredient, blended in a cap processing and delivering apparatus with a dewatered sand semi-slurry, the processed resulting capping composition being delivered in a manner such that a novel PAC cap layer is provided to a cap placement area in need of remediation.

2 Claims, 13 Drawing Sheets

(51) Int. Cl.
    *B01F 23/60*   (2022.01)
    *B01F 27/724*  (2022.01)
    *B01F 35/32*   (2022.01)
    *B01F 35/75*   (2022.01)
    *B01J 20/10*   (2006.01)
    *B01J 20/20*   (2006.01)
    *B01J 20/28*   (2006.01)
    *B01J 20/30*   (2006.01)
    *C08K 3/04*    (2006.01)
    *C08K 3/36*    (2006.01)
    *C09K 8/50*    (2006.01)
    *C09K 17/50*   (2006.01)
    *E02B 3/12*    (2006.01)
    *E02D 15/06*   (2006.01)

(52) U.S. Cl.
    CPC ...... *B01F 35/3204* (2022.01); *B01F 35/7541* (2022.01); *B01J 20/103* (2013.01); *B01J 20/20* (2013.01); *B01J 20/2803* (2013.01); *B01J 20/3021* (2013.01); *B01J 20/3042* (2013.01); *B09B 1/002* (2013.01); *B09B 1/004* (2013.01); *C08K 3/36* (2013.01); *C09K 8/50* (2013.01); *C09K 17/50* (2013.01); *E02B 3/121* (2013.01); *E02B 3/128* (2013.01); *E02D 15/06* (2013.01); *C08K 2201/005* (2013.01)

(56) References Cited

U.S. PATENT DOCUMENTS

| | | | |
|---|---|---|---|
| 5,490,741 A | 2/1996 | Fryer | |
| 5,775,836 A * | 7/1998 | Dean, Jr. | E02B 3/122 405/303 |
| 5,897,946 A | 4/1999 | Nachtman et al. | |
| 6,350,383 B1 | 2/2002 | Douglas | |
| 6,403,364 B1 | 6/2002 | Hince | |
| 6,558,081 B2 | 5/2003 | Hull | |
| 6,817,119 B2 | 11/2004 | Kerfoot | |
| 7,011,756 B2 | 3/2006 | Harrington | |
| 7,011,766 B1 | 3/2006 | Hull | |
| 7,101,115 B2 | 9/2006 | Luthy et al. | |
| 7,115,203 B2 | 10/2006 | Hayes et al. | |
| 7,128,498 B2 | 10/2006 | Sheahan et al. | |
| 7,326,346 B2 | 2/2008 | Lovell et al. | |
| 7,347,647 B2 | 3/2008 | Seech et al. | |
| 7,438,500 B2 | 10/2008 | Hull | |
| 7,581,902 B2 | 9/2009 | Zhao et al. | |
| 7,670,082 B2 | 3/2010 | Olsta | |
| 7,695,215 B2 | 4/2010 | Buhr et al. | |
| 7,824,129 B2 | 11/2010 | Ghosh et al. | |
| 8,287,210 B2 | 10/2012 | Hornaday | |
| 8,519,061 B2 | 8/2013 | Luster-Teasley | |
| 8,651,768 B1 | 2/2014 | McLinn et al. | |
| 9,085,021 B1 | 7/2015 | Rice et al. | |
| 9,162,263 B2 | 10/2015 | Elia et al. | |
| 9,463,496 B2 | 10/2016 | Sowers et al. | |
| 9,649,675 B2 | 5/2017 | Hwang | |
| 9,676,013 B2 | 6/2017 | Trauger et al. | |
| 9,725,140 B2 | 8/2017 | Kryzak | |
| 10,137,063 B2 | 11/2018 | Charrier et al. | |
| 10,278,748 B2 | 5/2019 | Aebi et al. | |
| 10,316,483 B2 | 6/2019 | Haeckel et al. | |
| 10,900,192 B2 * | 1/2021 | Sheedy | B65G 65/44 |
| 12,071,735 B2 * | 8/2024 | Timmis | |
| 2006/0051162 A1 | 3/2006 | Chesner et al. | |
| 2007/0210005 A1 | 9/2007 | Fang et al. | |
| 2009/0304447 A1 | 12/2009 | Buhr et al. | |
| 2009/0306452 A1 | 12/2009 | Paine | |
| 2010/0222481 A1 | 9/2010 | Jersak et al. | |
| 2013/0134105 A1 | 5/2013 | Van Nooten | |
| 2013/0306555 A1 | 11/2013 | Chattopadhyay | |
| 2017/0189948 A1 | 7/2017 | Hull et al. | |
| 2017/0203346 A1 | 7/2017 | Hull | |
| 2019/0134605 A1 | 5/2019 | Olsta et al. | |
| 2019/0262797 A1 | 8/2019 | Larson et al. | |
| 2019/0345368 A1 | 11/2019 | Sun et al. | |
| 2020/0179904 A1 | 6/2020 | Hull et al. | |

OTHER PUBLICATIONS

International Search Report and Written Opinion issued May 16, 2024 in related PCT/US2024/010519.
Final Rejection issued Mar. 6, 2025 in U.S. Appl. No. 18/793,445.
Non-Final Office Action issued Nov. 25, 2004 in U.S. Appl. No. 18/793,445.
U.S. Appl. No. 18/405,943, filed Jan. 5, 2024, by inventor Andrew Timmis et al.
U.S. Appl. No. 18/405,970, filed Jan. 5, 2024, by inventor Andrew Timmis et al.
U.S. Appl. No. 18/793,445, filed Aug. 2, 2024, by inventor Andrew Timmis et al.

* cited by examiner

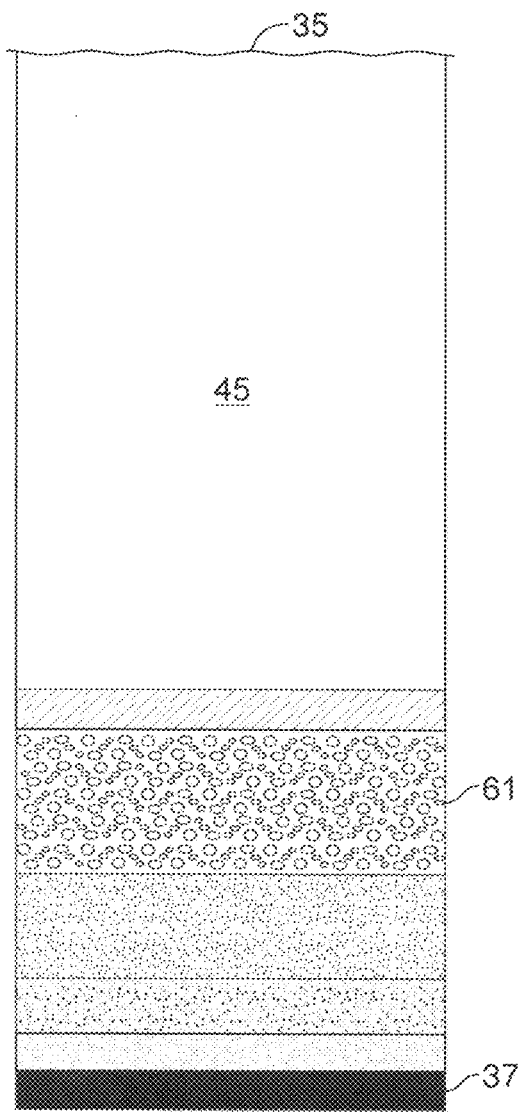
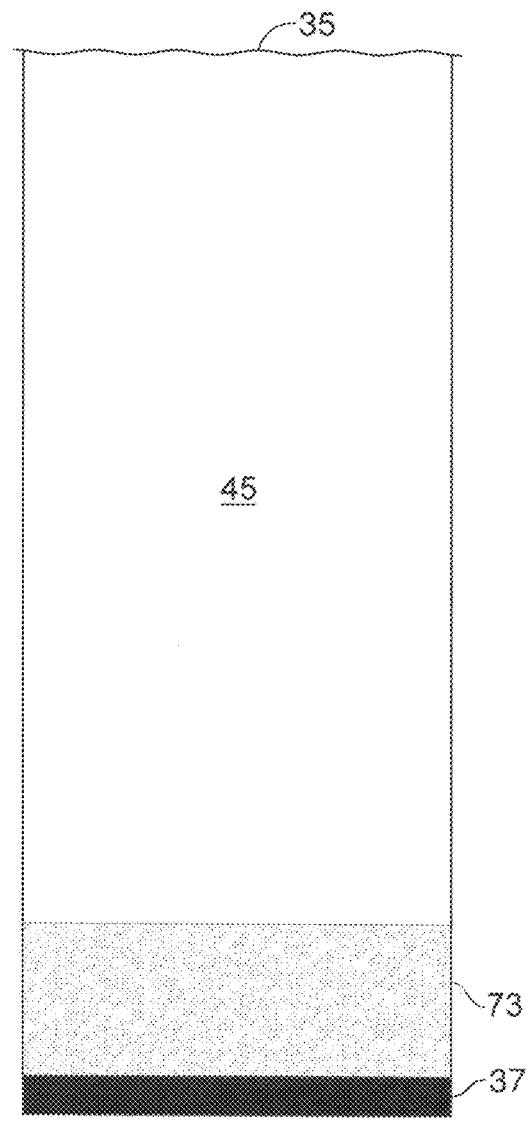
FIG. 6A Standard Industry Cap Layers
FIG. 6B Novel PAC Cap Layer

INTEGRATED PAC-BASED CAP DELIVERY SYSTEM, APPARATUS AND COMPOSITIONS

CROSS-REFERENCE TO RELATED APPLICATIONS

This application claims the benefit of U.S. Provisional Application No. 63/478,934, filed Jan. 7, 2023, which is hereby incorporated herein by reference in its entirety.

COPYRIGHT NOTICE

A portion of this patent disclosure contains material that is subject to copyright protection pursuant to 17 U.S.C. § 401, and the Vessel Hull Design Protection Act ("VHDPA"; 17 U.S.C. § 1301, et seq.). The copyright owner has no objection to the facsimile reproduction by anyone of this patent document as it appears in the U.S. Patent and Trademark Office patent files or records, but otherwise reserves all copyright rights whatsoever.

TECHNICAL FIELD

The invention generally relates to novel improvements and solutions in the field of sediment capping of hazardous sites in need of remediation. More particularly, embodiments are disclosed for integrating a preexisting sediment capping system with improvements such as a cap ingredient processing and delivery apparatus, cap processing method and novel compositional cap product, whereby a hazardous site is remediated by delivering at least one novel cap composition layer over the contaminated subaqueous waterway or terrestrial substrate floor. One embodiment includes finely powdered ingredients, including an Activated Carbon ("PAC") based adsorbing cap layer produced by the system and methodology disclosed, the cap layer ingredients comprising predetermined ratio amounts of dry PAC and dry powdered 2-Hydroxypropyl guar gum ("HGG") type ingredient, blended in a cap processing and delivering apparatus with a dewatered sand semi-slurry, the processed resulting capping composition being delivered in a manner such that a novel PAC based cap layer is provided to a cap placement area in need of remediation.

BACKGROUND OF THE INVENTION

Applicant Brennan Art

This section introduces background information from the related art that may provide context for aspects of the present invention or embodiments and is intended to facilitate a better understanding of what is disclosed herein. That such background art is related may or may not also render it as prior art, so this discussion is to be read in this light, and not as an admission of prior art. In the capping industry, the use of various subaqueous, partial-subaqueous, and terrestrial capping systems and compositions to cap hazardous sediment is well-known by those in the industry. Standard-known marine capping remediation solutions—capping being just one example—are generally complex solutions to protect waterways from the toxic waste that has often accumulated for decades. Prior to the invention disclosed herein, alternative forms of remediation have been used and found to be costly and inefficient to greater or lesser degrees. Further, many capping ingredients and compositions are known to be expensive and time-consuming to deliver to the site of remediation, and job delays are thus common due to unexpected delays in the processing or delivery of the needed capping compositions or materials.

The applicant, J. F. Brennan Company of La Crosse, Wisconsin, has been addressing these remediation capping issues for decades, and one example of the applicant's past solutions to multiple industry issues is shown in the applicant's own existing technology as the Brennan Capping System (BCS®), the teachings of which are disclosed in U.S. patent entitled "Method and System for Broadcast Sediment Capping" to Smith, et al., issued as U.S. Pat. No. 7,695,215 on Apr. 13, 2010 (the "215 patent"), which is hereby incorporated by reference herein for developed background for all that it teaches in the field of capping remediation, and which specially relates to and teaches the elements as designated herein in FIG. 1A and partially designed for convenience of understanding in FIG. 1B, infra.

The present application teaches multiple embodiment improvements over the earlier patent, as well as new embodiment novelties, and the disclosures within the '215 patent are for the most part considered to be background disclosure for purposes of the present application. However, to the extent that incorporated definitions or terminology in the present application conflict with any in the '215 patent, the present application meanings should be used over any prior terminology, in that any interpretation does not diverge with the body of patent terminology caselaw, which is a richer and more uniform source of dispute resolution than is possible in any given patent or application.

All patents and other government or private publications identified below in this application are expressly incorporated herein by reference. For example, the systems, compositions, and methodologies described in such publications could be used in conjunction with the present invention. These publications are provided solely for their disclosure of prior art systems known to the applicant before the filing date of the present application. Nothing in this regard should be construed as an admission that the inventors are not entitled to antedate such disclosure by virtue of prior invention or for any other reason. All statements as to the date or representation as to the contents of these documents are based on the information available to the applicants and do not constitute any admission as to the correctness of the dates or contents of these documents.

Commercial Capping Composite-Aggregate Art

Many commercial capping products known in the field are within a category of materials known as "composite-aggregate" technology. This means that the capping materials are commercially manufactured, bagged, and shipped as products that contain a plurality of processed composite particles of slightly variable size, or the composites may be pressed, cured, or dried as pellets. Composites often have some type of core material, such as stone or rock, gravel, clay, or even sand, and depending on the anticipated use will include various outer layers around or encapsulating the core material, which may consist of adsorbing carbon-based materials.

The outer layers also often include materials capable of absorbing water and swelling, such as clays. Thus, the entire composite often has a specific gravity greater than the water it will be placed into and, therefore, can readily settle or sink to the bottom of the waterway. Several known commercial products are in the classes described above, with the more commonly used being known by the tradenames Aquablok® and AquaGate® from AquaBlok, Ltd., Toledo, Ohio, and Sedimite®, from Sediment Solutions, Endicott City, Maryland, for example. Teachings related to the general composite structures above are taught in U.S. Pat. No. 5,897,946

"Flowable material to isolate or treat a surface," to Nachtman et al., May 14, 1999, with assignee AquaBlok, Ltd.

More specific to the embodiments of the present invention, the AquaBlok, Ltd. company has more recently experimented with a PAC-related composite called AquaGate+PAC, which uses PAC as an ingredient in a stone-based composite. However, those with skill in the art will recognize that these commercially available capping composites have varied manufacturing protocols and shortcomings that will differentiate the composites from the embodiments of the present invention. For example, these composite products, including AquaGate+PAC, are customarily manufactured at remote offsite facilities from the capping remediation site and are limited by relatively slow, low production rates. It is common for the composite manufacturing process to require months to produce and deliver sufficient capping material for a sediment cap that may only require days to place over the remediation placement area. In use and in the field, these pre-made materials are fragile, expensive to manufacture, bag and ship, and as being made from a factory remote from the remediation site, the product shipping is costly. Once on the remediation site, the storage of these highly sensitive and fragile composite products often creates logistical issues at a construction site, as the materials must remain in dry storage for long periods. Logically, the contractor's storing of large quantities of expensive, weather-sensitive, and fragile aggregate pellets around construction waterways often requires taking prime useful space from other significant project needs, and also risks the products becoming activated due to water-contaminated. Thus, as a general consequence, the remote factory processing of these art composites increases remediation project costs, and as the capping contractor often has little control over the shipping schedules, this often further leads to costly work delays and downtime, where the on-site capping laborers have to wait on the composite delivery, often with little to do relating to completing the capping project. Should additional material be required due to miscalculations, delivery discrepancies, or changed site plans (for example, the need for additional cap layers), the on-site capping contractor often loses on-site time and valuable man hours as the capping crew must wait as more materials can be created and shipped to the capping site. Thus, overall, the logistics relating to the use of remotely processed composite particles is costly and problematic in many ways, and these considerations often make the efficient capping of a site in need of remediation with composites commercially unfeasible.

AquaBlok, Ltd. has occasionally manufactured composite materials on or around the general capping project locations to circumvent these issues. However, the associated costs to install a small local processing plant for one project are known to be often prohibitively high, and the process to create the composite capping material on site is still much slower than the applicant's own industry-leading cap layer placement rates achieved through the applicant's patented capping system described in the '215 patent, which is well-established and known in the art. Furthermore, the composite capping materials typically need a curing or drying time, so the local plant again is not optimal due to this critical but added step in the composite process. Thus, none of the respective remote factory-made aggregates, such as Aquablok®, AquaGate®, or Sedimite®, have resolved the significant and ongoing industry issues relating to using PAC as a capping ingredient.

However, the present disclosure provides novel solutions to the capping industry's logistic and material shortcomings.

As needed in the industry, the present disclosure teaches embodiment solutions of integrating an on-site cap processing and delivery apparatus that allows for the unprocessed capping ingredients, in this case, less expensive and commercially available powder such as powdered guar gum and PAC, to be processed and delivered at the capping remediation site, and by doing so need only to further process the capping composition on-site by combining the powders with dewatered or slightly-watered sand being locally sourced, so already available on-site. Through the present disclosure, it is further contemplated in embodiments of the invention disclosed herein that have the powdered ingredients processed in situ in smaller quantities on an 'as needed' basis (i.e., without a sand ingredient included), allow the processed ingredients to be delivered on demand to a cap placement area as a ratioed (i.e., tailored) capping composition and thus novel cap layer.

It would therefore be advantageous to provide capping improvements that include in situ cap ingredient processing without the need for additional ex-situ manufacturing, thus having superior cost advantages, being safe, and providing unexpected physical properties that improve the quality of the final cap layer product and provides meaningful advantages over the art. Given all the complexities of environmental toxins and the complex designs of capping systems in today's industry, the applicant's integrated on-site system and novel ingredients now supersede the remotely manufactured past solutions used for capping products and systems. Therefore, the many embodiments of the invention described herein are directed at resolving or reducing the recognized industry problems.

Capping System Art Relating to the Use of Activated Carbon, and Specifically PAC Other industry art is described herein to illustrate better the context of PAC powder in embodiments of the present invention and the shortcomings of PAC-based capping from the industry perspective, all of which will become clear. Historically, Granular Activated Carbon ("GAC") has been chosen as a carbon capping ingredient over PAC, as PAC poses many problems, the most prominent being that it was thought counterintuitive, if not impossible, to pass the very finely powdered and hydrophobic PAC ingredient through a water column and deliver the fine powder on a waterway floor, as needed to remediate the hazardous waste in the bottom substrate. While attempts were made, those innovations were similar to the composite materials described above.

Further along those lines, the art below is provided for example only and intended to illuminate and give context to the novel and unobvious improvements made to the invention embodiments disclosed in this application. Specifically, U.S. Pat. No. 9,162,263, entitled "Barge system for hydraulic spreading of aquatic capping material," dated Oct. 20, 2015 to inventors Elia, et al. (assignee Sevenson Environmental Services), is one such reference where those of skill in the capping industry taught away from the use of PAC in modern capping systems. As a first point related to the present invention, while Elia specifically teaches a capping system, the disclosure fails to teach or suggest any fully integrated in-situ capping system and in no way impedes the patentability of the present invention. However, and more to the point of industry problems and GAC-PAC material comparisons described by Elia and stated below about carbon-based cap ingredients, the patent suggests using the granular activated carbon ("GAC") as a carbon-based capping ingredient, as is well known in the art, while the Elia patent at the same time teaches away from the use of the much finer powdered PAC as a capping ingredient, stating it's reasoning in col. 10, lines 41-46: "Activated carbon exists in 2 forms: granular activated carbon ("GAC") and powdered activated carbon ("PAC"). It has been determined through testing that PAC generates turbidity in a natural water column if applied in the aquatic capping operation. GAC was found to produce more acceptable results and is, therefore, preferred for use with the barge capping system."

The present inventors have found just the opposite and experimentally discovered excellent PAC-based results as described herein in the specification, having directed several experiments that indicated when PAC was employed in specific embodiment ratios and combined in other dry finely powdered delivery ingredients, such as in one case, guar gum powder, the PAC passed the capping area water column exceptionally well, and with little turbidity. This has been experimentally established by the present inventors on an in-situ capping site, as further disclosed in this application. As will be seen, using guar gum powder as a delivery ingredient for PAC, as demonstrated by the present inventors through experimentation, negates this industry view that PAC does not work well in a natural environment.

As is clear from this background study, increased costs in project times, material waiting costs, uncertain shipping and storage costs, system maintenance issues, manpower downtime, and even product viability are all variable factors that can significantly influence the cost-effectiveness and productivity of a capping project. A great need thus exists for cost-effective, safe, and reliable capping systems, machines, methods, and compositions that allow for non-toxic and efficient containment of hazardous underwater sediments. The present invention provides these solutions as novel, unobvious, and well-integrated improvements relating to the environmental issues described through an improved ingredient processing apparatus and new PAC-based capping compositions, and these can significantly decrease the material shipping, downtime, storage, and containment costs, and allow for more significant amounts of contaminated subaqueous sediments to be remediated with smaller amounts of capping composition, and minimal disturbance to the pre-existing sediment and water.

SUMMARY OF THE INVENTION

Embodiments of the present invention improve upon the applicant's own '215 patent in novel and unobvious ways. For example, by integrating an on-site processing and delivery apparatus and PAC-based capping ingredients, the ingredients are blended in situ and delivered through the processor, creating novel compositions that remediate capping areas as a cost-effective PAC-based cap layer not previously achieved in the industry.

One embodiment of the invention contemplates blending dry ingredients on-site that include one or more finely powdered guar gum and activated carbon ingredients and a new on-site apparatus comprising an internal axleless augur capable of actively blending and delivering the ingredients as a newly formed composition. An example embodiment includes dry powder ingredients 31 being simultaneously fed into the integrated processor 40 through ingredient container bins 41 and 43, and further blended with a dewatered sand-semi-slurry discharged from shaker output 20, the ingredients being concurrently blended and delivered through the integrated processor 40, forming a new composition that is delivered to an output hopper 38 and conveyor belt 36 and finally to a cap composition broadcasting subsystem 24 to further deliver the processed capping composition to the vessel distribution pool 28, water column 45, and finally settled on the waterway bottom substrate 37. Thus, the present invention embodiment delivers an improved remediation PAC cap layer to a polluted subaqueous area in need of remediation, through using a novel capping delivery ingredient such as powdered guar gum, which when blended with PAC and delivered create a novel and cost-effective PAC-based composition and cap layer over the bottom substrate of the hazardous capping area in ways not seen before in the capping industry.

While multiple aspects of the present invention are disclosed, such as the integrated processor, capping ingredients and a novel end cap product, other aspects will become apparent to those skilled in the art based upon the following specification. As will be apparent to those of ordinary skill in the art from this disclosure, certain aspects of the invention disclosed herein may be modified in various ways, all without departing from the spirit and scope of the disclosure and claims as presented herein. For example, the integrated on-site processing and delivery apparatus may be integrated on-vessel or in other areas of the work site, and still be considered to be processing and delivering the capping ingredients in situ. Likewise, the PAC-based ingredients and resulting cap layer may incorporate any number of different delivery ingredient ratios and compositional modifications and still fall within the contemplated invention. Accordingly, the textual description and figures are to be regarded as illustrative in nature and not restrictive.

BRIEF DESCRIPTION OF FIGURES

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

FIGS. 6A and 6B are views shown to illustrate the comparative difference in thickness of the subaqueous sediment cap layers between the prior art and the present invention.

DETAILED DESCRIPTION

Figure 1A:
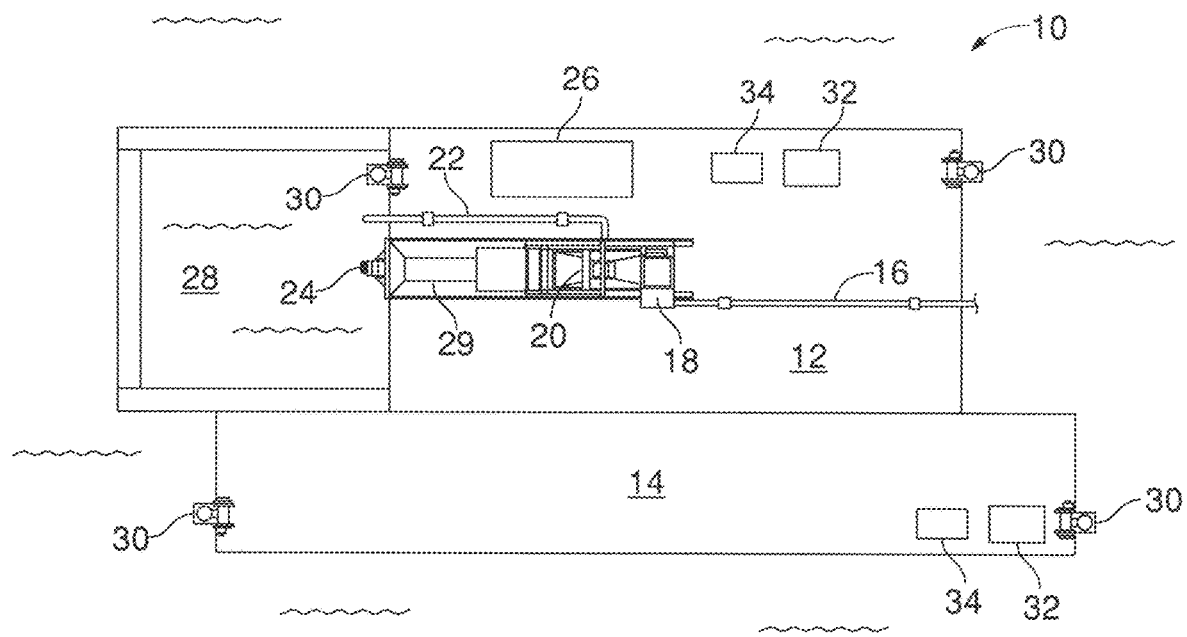
FIG. 1A depicts a top plan view of a prior art broadcast capping system.

To assist a clear understanding of the many embodiments, objects, features and advantages of the present invention, the following descriptions of the drawings are offered. In the present context, these drawings refer to visual elements of the invention that are intended to assist one of skill in the art in understanding. While tables may be included in sections of this application, they are not described as drawings within this brief description. Arrows are provided in certain figures to indicate movement or flow of water, sand, slurry, ingredients or compositions through the system. Embodiments of the improved capping system, method, apparatus, compositions, and product-by-process of the present invention, as well as other objects, features, advantages and characterizations of this invention, will be more fully understood and apparent from the following drawings, definitions and descriptions, wherein:

FIG. 1A depicts a top plan view of a prior art broadcast capping system 10 in accordance with U.S. Pat. No. 7,695,215 to Smith et al, issued Apr. 13, 2010 as "Method and System for Broadcast Sediment Capping" ("215 patent"). The '215 patent is assigned to the present applicant. FIG. 1A of the '215 patent is provided here for exemplary purposes, and is intended to illustrate preexisting embodiments, and also be used for convenience to point out the clear novel and unobvious improvements that have been made to the preexisting technology, as the '215 patent technology is compared with the present inventions disclosed and claimed herein.

Figure 1B:
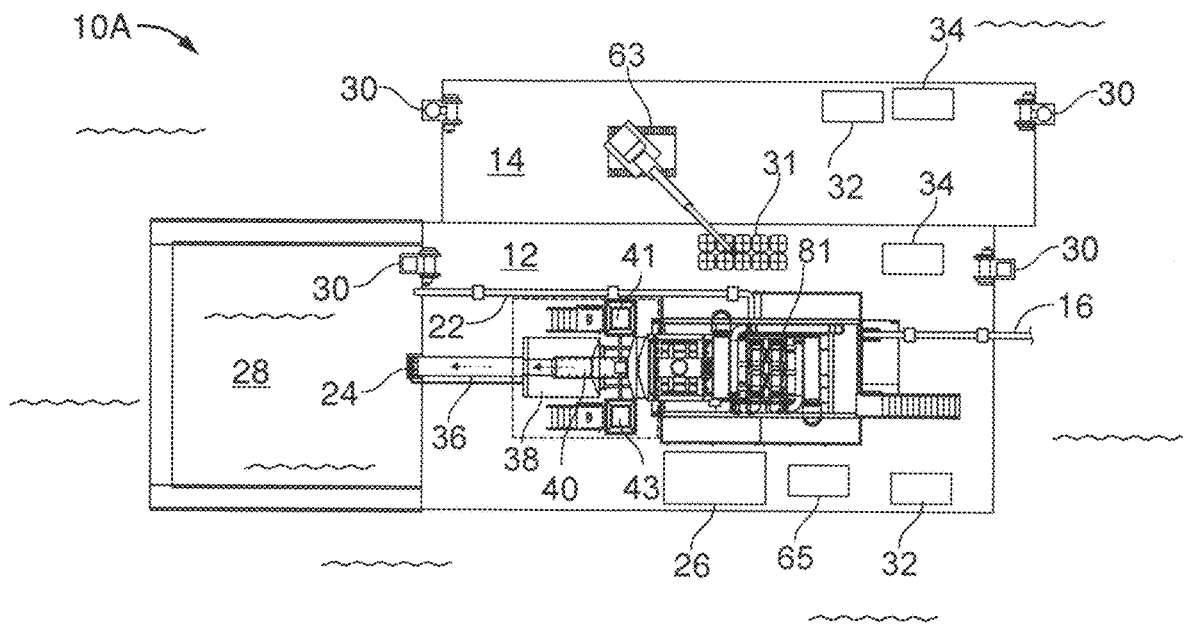
FIG. 1B depicts a top plan view of improved elements of the present invention's capping layer delivery system.

FIG. 1B depicts a top plan view of improved elements of a capping layer delivery system designated in 10A in accordance with at least one embodiment of the present invention.

Figure 2:
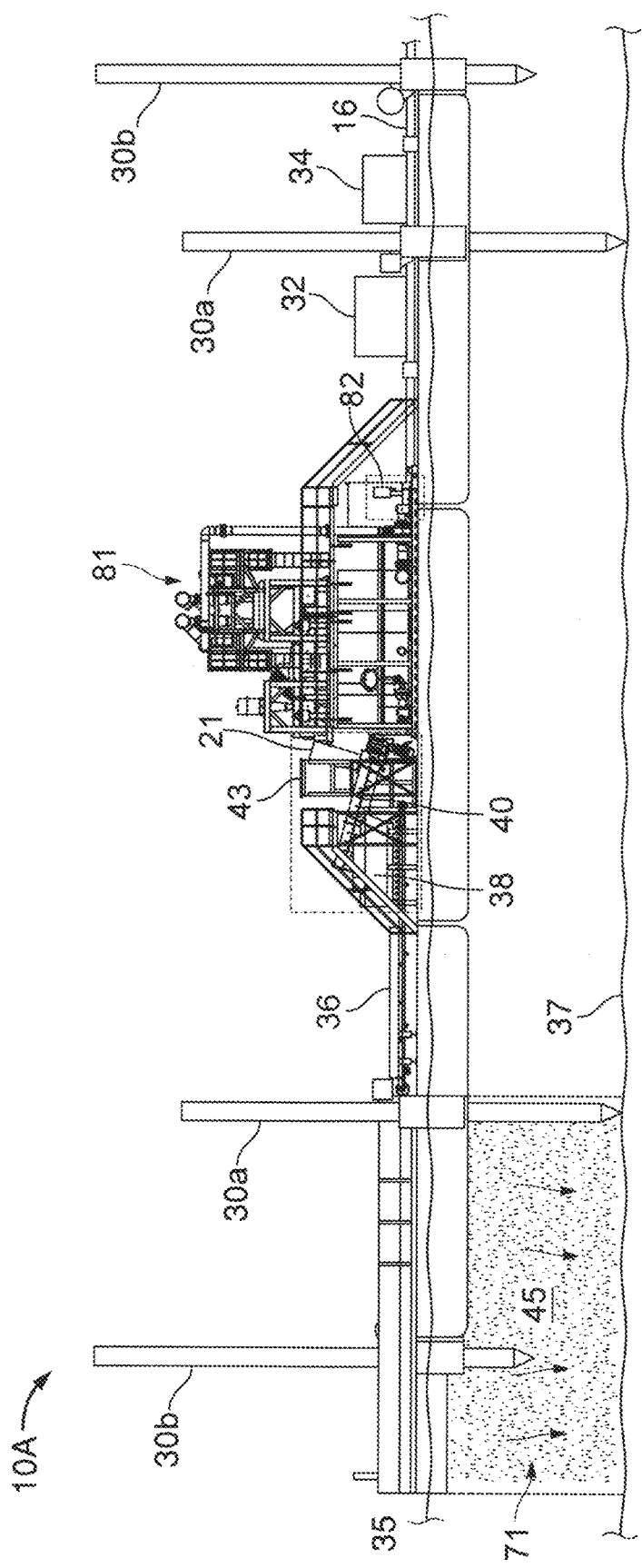
FIG. 2 depicts a side view of the present invention's improved capping layer delivery system.
Figure 7:
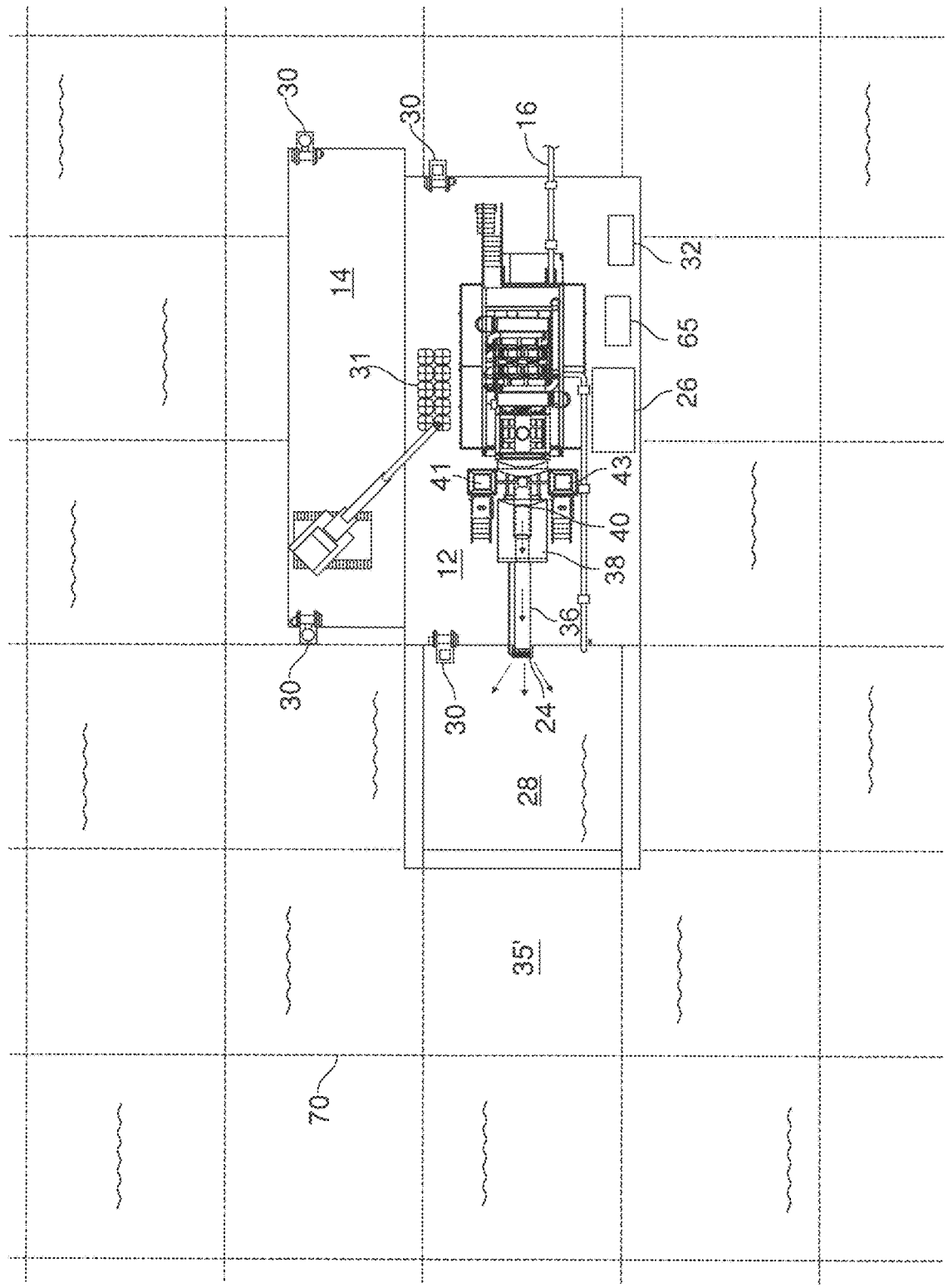
FIG. 7 is another elevated view of the capping layer delivery system.

FIG. 2 depicts a side view of the improved capping layer delivery system 10A according to FIG. 1B with particular emphasis on the integrated processing and delivery apparatus 40 as incorporated within the broken lines in the figure, relative to the System 10A, and allowing a perspective of the in situ water column 45 perspective with a capping composition layer 73 as dispersed 71 (FIG. 2) and seen from the subaqueous perspective relative to the distribution pool 28 as shown in FIG. 1B, as prior to having settled at waterway bottom substrate 37 (see FIG. 7). The FIG. 2 also illustrates a non-limiting example of the barges 12 and 14 positions relative to each other and as related to the spud 30a and 30b elements. The spud elements described herein and seen in the FIG. 8A legend. While non-limiting, FIG. 2 further depicts an elevated side perspective with a particular emphasis on the enlargement of the integrated processing and delivery apparatus 40, illustrated within the broken lines, and in accordance with at least one embodiment of the present invention. Sequentially, the drawing refers to the apparatus 40 blending and delivery sub-system, as referring back to system 10A, and broadly illustrates the dewatered sand being discharged at shaker 20 to apparatus intake chute 21 from dewatering shaker 20, and one ingredient intake bin 43, into which the stored capping ingredients 31 may be manually or machine 63 provided to blending and delivery apparatus 40, in a manner such that a resultant blended sand slurry and dry ingredient composition 71, which is deposited into hopper 38, further gravity feed delivered to conveyor 36, and finally delivered to broadcast 24 the composition into a pool area 28, to eventually settle through water column 45 and as composition 71 and resolve as final cap layer 73 (see FIGS. 4A-4B). In a non-limiting embodiment, the cap ingredient blender and delivery processor 40 is manually controlled by a human operator through apparatus control 41 as powered by power means 65, although other embodiments are contemplated in accordance with at least one computer operated embodiment from control center 26.

Figure 3:
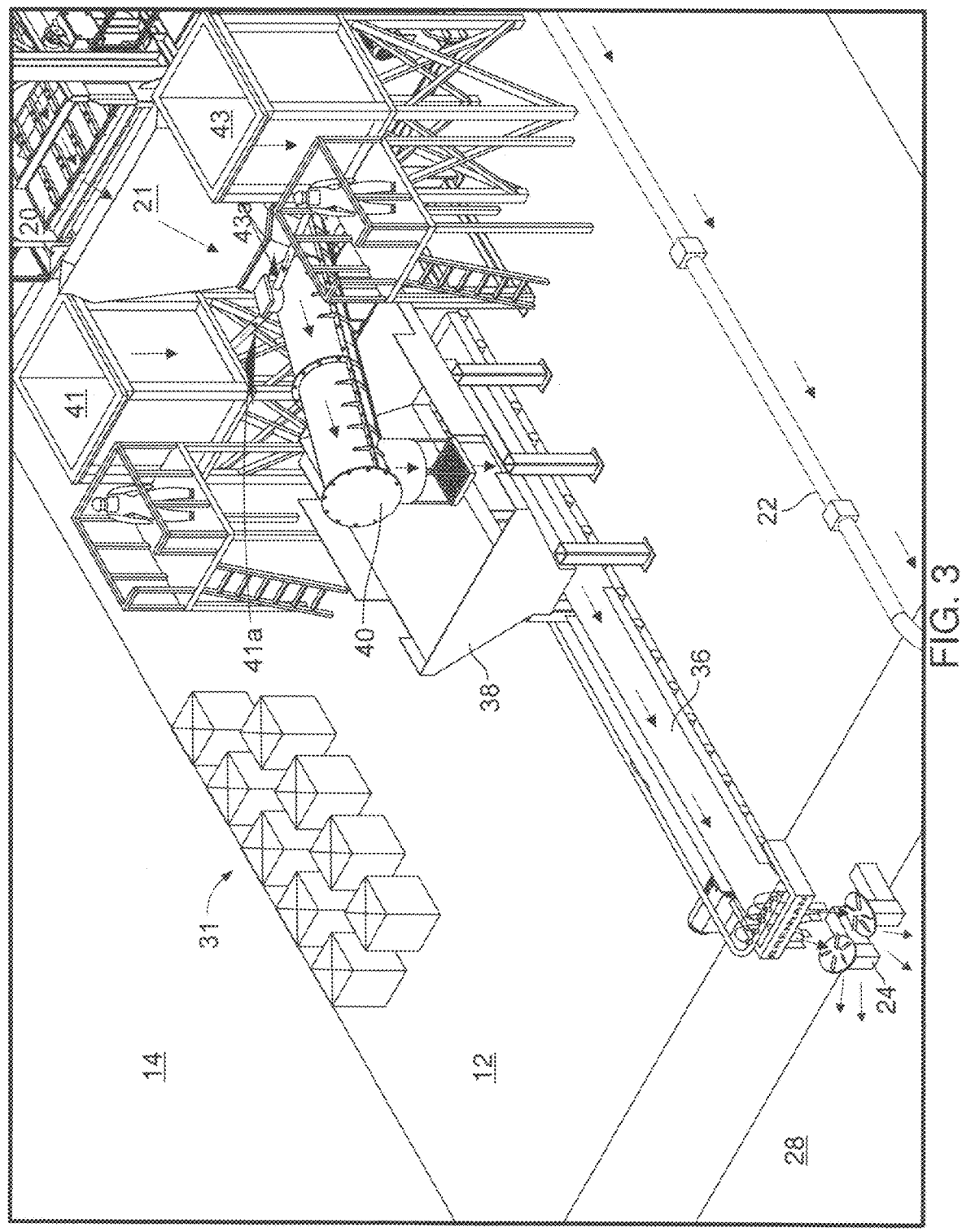
FIG. 3 depicts an elevated side perspective of the present invention's improved capping layer delivery system.

FIG. 3 further depicts an elevated side perspective of the improved broadcast capping system according to FIG. 1B and FIG. 2, with an enlarged emphasis on integrated processing and delivery apparatus 40 as illustrated and in accordance with at least one embodiment of the present invention. The drawing refers to the apparatus 40 blending and delivery sub-system 48 in FIG. 4 as referring back to system 10A, and uses arrows to broadly illustrate the intake and output flow of the dewatered sand ingredient is semi-slurry 20, the stored pre-processed capping ingredients 31 being manually placed for later blending steps combined into one or more ingredient feed bins 41 and 43, and using directional arrows again, the ingredient and sand dewatered slurry blending flow from 41a, 43a and 21, respectively, through apparatus 40 in a manner such that a composition is blended and delivered from inside of the apparatus 40, and deposited into hopper 38, conveyor 36, broadcasting 24 into the pool area 28, to become a cap layer 37. As used herein, ingredient storage and process terms such as "bin" "container" and the like are used interchangeably for element 41 and 43, and in the present case refer to solid capping ingredient bulk storage and delivery-based units, with the multiple bins 41 and 43 being configured to contain multiple on-site powdered capping ingredients 31 (dry PAC and guar gum powder serving as non-limiting examples), and being used to store and deliver the dry ingredients to apparatus 40 by way of one or more ingredient feed tubes or 41a and 43a, thus allowing the stored ingredients to be steadily feed as method step 49a into the ingredient processing and delivery apparatus 40 with rotating augur 54 in conjunction with the dewatered sand being simultaneously fed into the processing apparatus input chute 21, from sand shaker 20, in a manner such that the multiple ingredients and dewatered sand semi-slurry can be simultaneously blended together and delivered forward by the rotational movement of the means of a motorized rotary axleless auger 54, with a resultant capping composition being formed at a rate specific to the chosen auger 54 speeds, as augur 54 is longitudinally positioned and contained within a one piece think metal processor housing 53, and the composition blending and processing speeds further dependent upon the selected static blending screen 55b aperture sizes chosen as well. Smaller screen aperture 55b sizes have a tendency to slow the process but blend the output composition into finer gradations, as opposed to a larger screen aperture 55b sizes which has the tendency to quicken the delivery process and allow for the breakup of larger congealed clumps, that may be gumming, cementing or a "plasticizing" of the blended composition prior to the step 49a of the blended composition being discharged into hopper 38 for further method step 49b of composition delivery to conveyor 36. The present clogging of the screen 55, attention is paid to the process by an operator on-site. However, with the capping parameters usually planned well in advance of the on-site capping job, those of skill in the art will understand that the specific capping required will be considered and the proper planning made to ensure that the capping systems are correctly sized and calibrated to avoid the problems mentioned above.

Figure 5A:
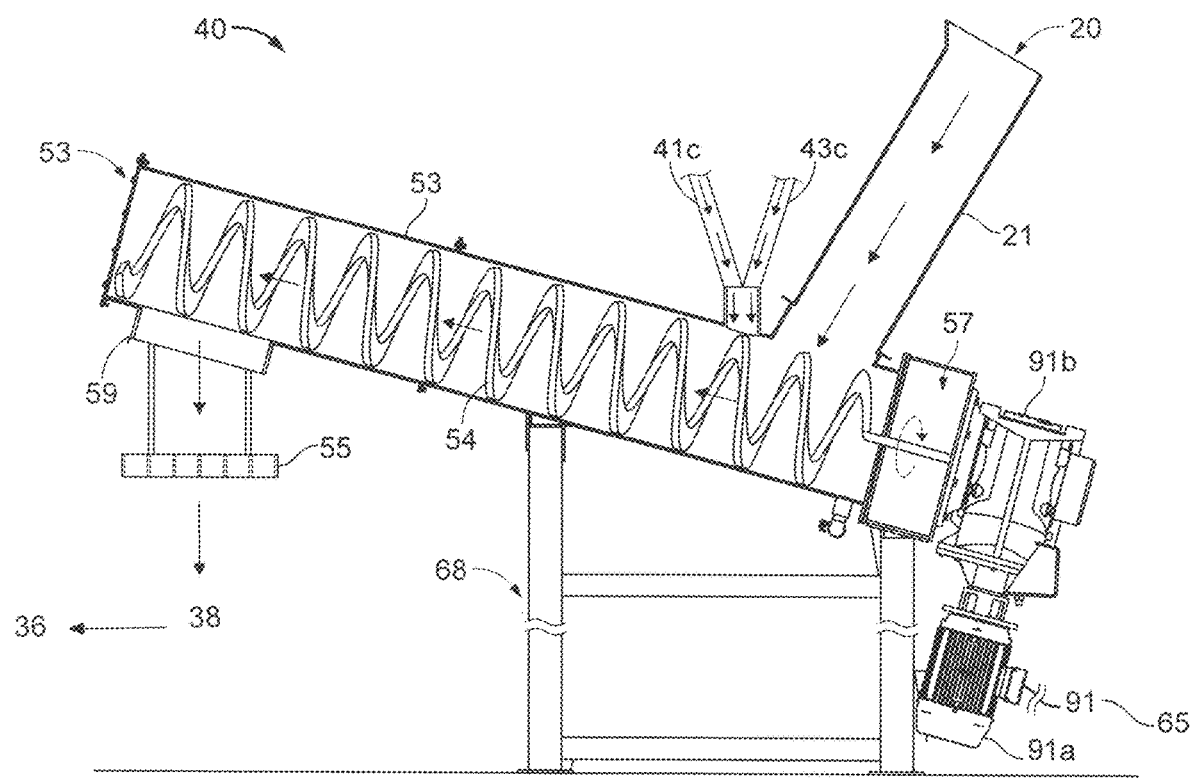
FIG. 5A depicts a cross-sectional side perspective view of the blending and delivery apparatus of the present invention.
Figure 5B:
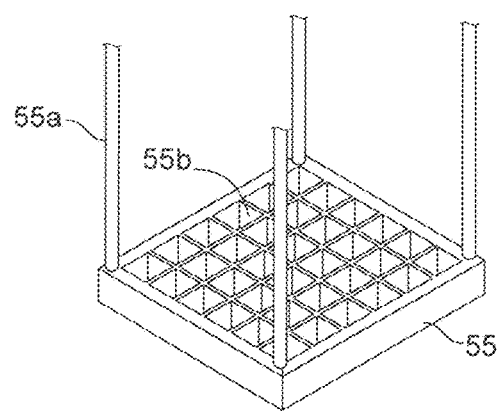
FIG. 5B depicts a static screen that may be used in conjunction with the blending and delivery apparatus of the present invention.

While FIG. 5A and FIG. 5B will further elaborate, it can be described here that while the motorized rotary axleless auger 54 of the present invention is not limited by any particular motor 41*a* or gearbox 41*b* type, the motor embodiment explained herein utilizes a 25 horsepower four-phase induction motor, model W22 NEMA Premium Efficiency motor, having an accompanying gearbox 41*b* and connected by sufficient power connections 41 to the electrical controller and activation means 65, as commercially available from WEG Electric Corp., with a U.S. headquarters office located Duluth, Georgia. However, those of skill will recognize that any suitable alternative motor and gearbox combinations may be used to drive the augur rotation, according to the needs of the capping project. In the present embodiment, the motorized augur 54 is rotated by motor 41, with motor 41 further actuating the augur by way of a gearbox 41*b* through augur drive 57. The motor allows for forward and reverse rotation of the augur, as well as variable augur rotation speeds. These features allow the advantages of being able to reverse direction should the blender housing be clogged, and thus allow for the backward pulling of the composition from the extended section of the blender housing, thereby decreasing compositional pressure on all blending apparatus. Any clogging can thereby be cleaned from the housing prior to the cementing of the composition. Further, the variable speed may lessen or eliminate composition clogging as the operator can observe the ingredient flow and adjust the augur speed as needed to regulate or coordinate the ingredient input flow and composition discharge flow, and thus eliminate potential issues when recognized. Further advantages of the rotary axleless auger 54 contained within the one-piece housing enclosure 53 in the present embodiments can also be recognized, in that the blending and conveyance functions of the blender are simultaneous achieved through the combination of augur rotation within the closed confines of the cylindrical housing, and simultaneous blending of the added ingredients, both functions based on the rotation forces applied convey or deliver the blended ingredients, which as blended result in the capping composition. Through this continual rotative action, the augur further moves the blended capping composition from the proximally located input sections of the housing to the discharge opening 59 portion located on the housing's distal end. An additional advantage of the non-axle augur necessarily means that augur need only be secured at the contact point with the gear box. Thus, if, or as needed, the housing 'cap' at the distal end may be unbolted and removed, and the inner housing can be cleaned of unwanted composition, broken down for relocating to another remediation site, or otherwise serviced. These benefits contribute to the various system and method embodiments in a number of ways. For one example, in the non-limiting embodiments taught herein, it was found that a dewatered sand ingredients combined with multiple ingredients PAC and guar gum powder ingredients could be consistently blended and delivered by the apparatus 40, in the appropriate but non-limiting ingredient ratios taught (see Table 1), and in manner of the system and method disclosed within, thus allowing for the on-site blending and delivery functions that constitute the blender and add to the prior system components described in the '215 patent, to deliver the final cap layer improvement over the art. While the materials comprising the housing 53, stand 61 and screen 55 is not in any way limited, those of skill will recognized that the housing will necessarily be of a metal of the grade that can withstand the pressure of a commercial capping operation of the type described herein. In the present case, all components are made of industrial grade steel, and constructed by means of bolting or welding, or other heavy securing means, as appropriate.

Those of skill will recognize that the aperture size 55*b* will depend on the compositional output sought, but in general, the screen aperture opening size for a standard capping project may be about a 4 inch×4 inch square area, with any number of resulting aperture openings from just one (in the case of no screen 55 being affixed by blending screen attachment means 55*a*), or to a few large openings being utilized as aperture 55*b*, to many hundreds of smaller screen aperture 55*b* openings being contemplated.

While it is contemplated that each capping ingredient storage bins 41 and 43 can contain several tons of PAC and guar gum powder prior to cap ingredient processing, the bin sizes and geometries are not limited, but may be used to describe a storage vessel of any suitable shape and volume, as known in the art. Furthermore, the bins may be filled by any suitable known means, including by hand, heavy machinery, such as backhoe, for example, or by more exotic and sophisticated mechanical and computerized system that are known to those of skill in the art. Likewise, it is further contemplated that the component hopper 38 and metered conveyor means 36 need not be limited to any specific type, but may include any hopper or conveyor that are already known in the art or as practiced in the '215 patent in the illustrated embodiments. For example, and in regard to FIG. 3 embodiments, the spreading means 24 may or may not be used in certain embodiments, and in at least one embodiment the spreading means 24 includes a metering hopper 38 and belt scale 36 for weighing the distributed capping composition prior to delivering the composition into the pool 28 and working together as an integrated system. It is further contemplated that the size and shape of ingredient bins 41, 43, apparatus 40, hopper 38 and conveyor 36 may be selected by appropriate size based upon the capping composition and desired rate of distribution. Also included in alternative embodiments are the coordinated computerization of the capping apparatus intake, blending and compositional delivery in a manner such that the cap layer process in FIG. 4A and FIG. 4B infra may be automated or partially automated and under the control and monitoring of control center 26.

Figure 4A:
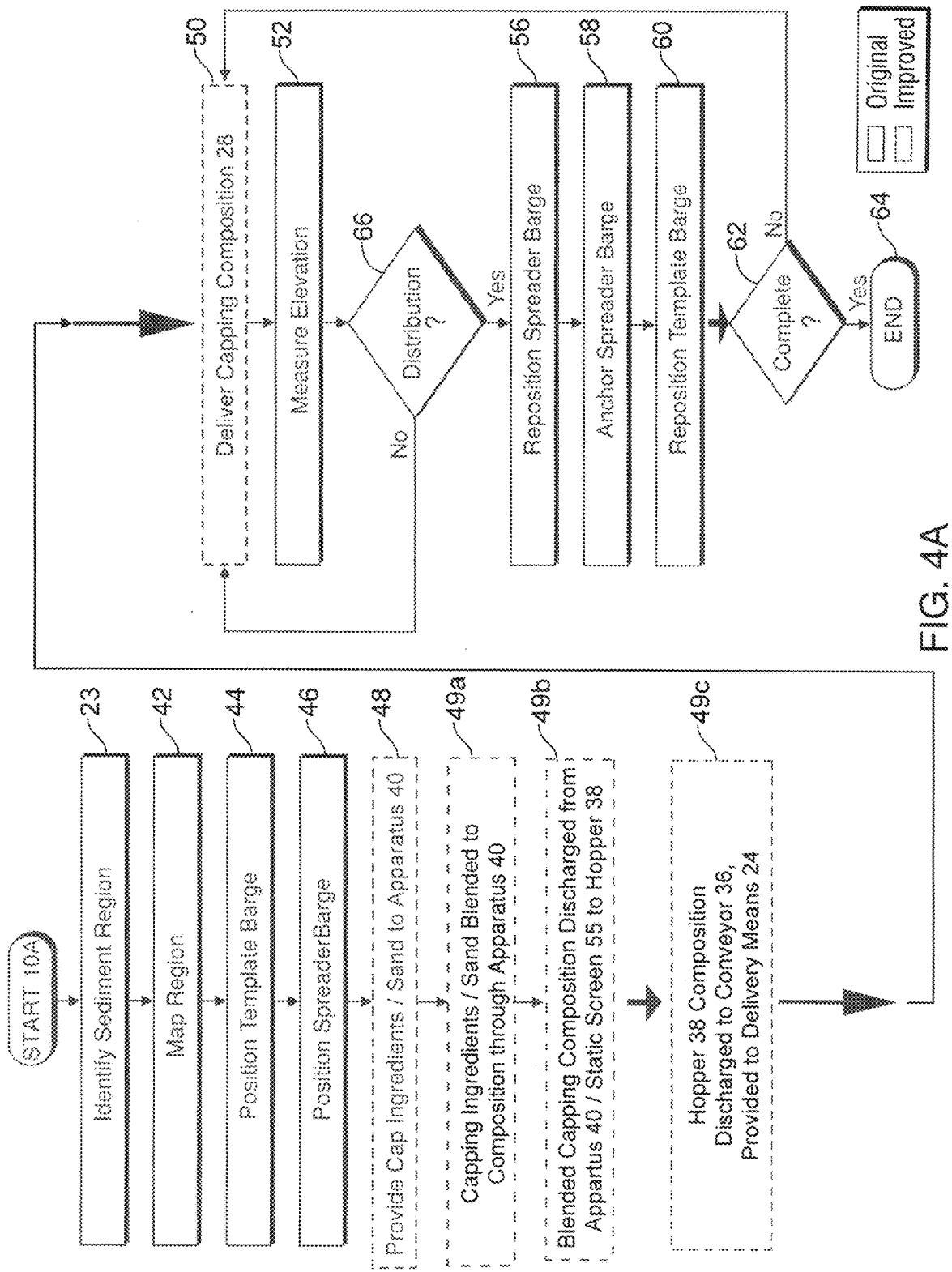
FIG. 4A depicts an exemplary block diagram illustrating a plurality of preferred selected steps associated with the present invention's capping layer delivery system 10A.
Figure 4B:
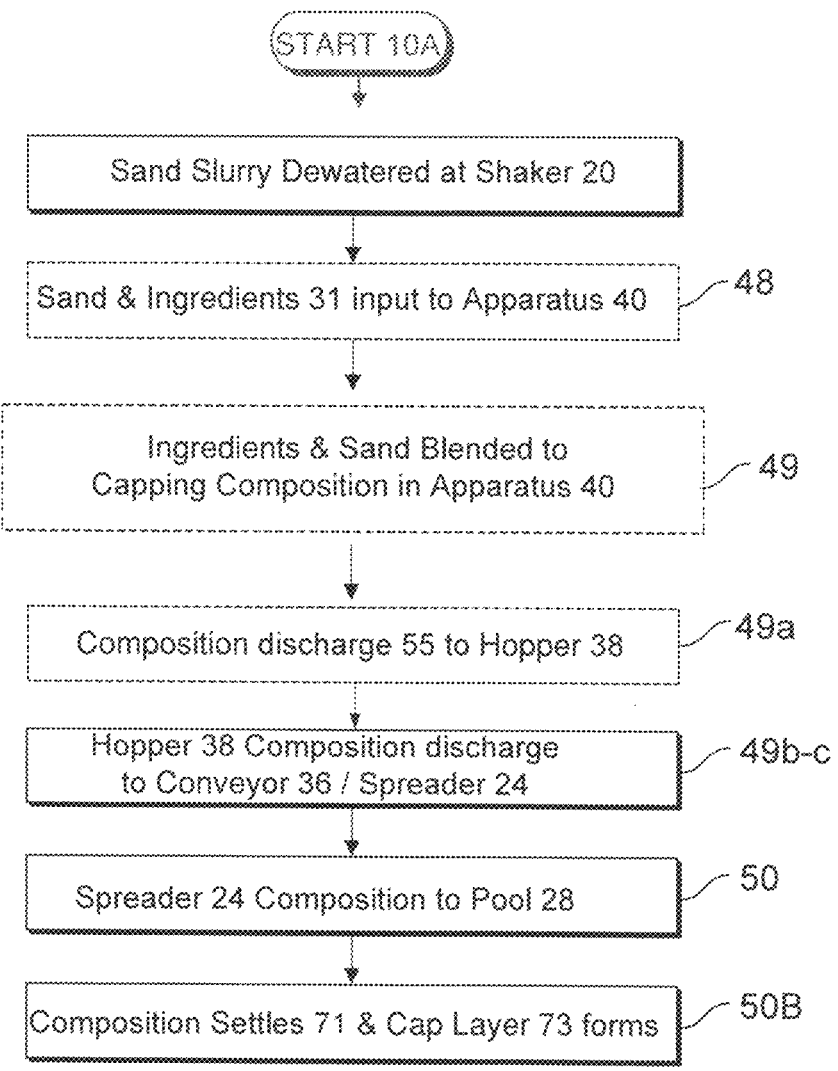
FIG. 4B depicts a flowchart showing selected steps 48-50B in the method of FIG. 4A for making an improved cap layer according to embodiments of the invention.

FIG. 4A depicts an exemplary block diagram illustrating a plurality of preferred selected steps in system 10A steps 48-50 and corresponding to related system functions in the original '215 patent, further including new process steps 48-50 in the FIG. 4B methods with related functions and steps as to system 10A represented within the broken outlined boxes for the integrated ingredient processing and delivery apparatus in FIG. 4A and FIG. 4B to deliver an improved cap layer composition according to at least one embodiment of the invention. FIG. 4B is a flowchart showing selected steps in a method 48-50B of making an improved cap layer according to embodiments of the invention. The selected methods include providing a carbon containing cap layer to a substrate area at 37.

In referring to the alternative execution of the FIG. 4A and FIG. 4B, steps 48-49, an alternative embodiment of blending system and method in steps 48-49 is provided as starting in step 48. And which the apparatus may not be mounted on the barge but at another location on-site. In this context, the step of providing one or more ingredients as step 48 to apparatus 40, the step 48 may include, but does not necessarily have to include, an inclusion of sand semi-slurry or dry sand at blending 49, and the ingredients (for example, PAC and guar gum powder) may be dry-blended without the sand semi-slurry or dry sand at step 48, and in the embodiment without the sand intake at step 48, the step 49 blending ingredients to resultant composition in apparatus 40 will necessarily include a blended composition without sand. Additionally, while the delivery steps of 49-50 may include a sand-free composition discharge 55 to hopper 38 as step 49a, the resultant sand-free dry composition blend by apparatus 40 may alternatively instead include the storing of the mixed composition on or away from the capping site without the added sand for later distribution steps 48-50 as taught within.

For a number of the embodiments herein, control center 26 may be used to automate the functions of the system or methods in FIG. 4A and FIG. 4B (and FIG. 5A and FIG. 5B). For example, as the center 26 includes a computer which can utilize a variety of subaqueous analysis and measuring software as is taught in the '215 patent that automate the capping hull 12 and 14 movements and coordination of spud 30a and 30b synchronization and movement, additional computerized functions have been alternatively contemplated as well. For example, the FIG. 4A and FIG. 4B system and functional steps may be computerized or partially computerized as related to the FIG. 3 automatization of the filling and control of bins 41 and 43, which may allow for a safe and effective manner in which the ingredients 31 may be processed in conjunction with input chute 21, apparatus 40, hopper 38, conveyor 36 and spreader 24 to deliver a precision cap layer 61 or 73 in automatic or semi-automatic fashion. In this way, the capping ingredient and composition spreading information stored in the present '215 patent system databases may include additional information related to the time and date of the ingredient-composition batch blend amounts, actual ingredient-composition layer tonnage information at both input and spread steps, ingredient layer thickness and density, spread layer depth and system time durations, etc., for any relevant system or method 48-50 steps. All of this information may be available to be viewed via an Internet web browser or hand-held computers in the form of a pre-developed reports.

FIG. 5A depicts a cross sectional side perspective view of the integrated processing and delivery apparatus 40, including a side perspective of the FIG. 5B secondary blender static screen 55, which typically operate in conjunction together as a capping ingredient blending and conveying capping ingredients as outlined in FIG. 4A and FIG. 4B method steps, having a cap composition delivery to the output hopper 38 and cap composition conveyor 36 as provided according to at least one embodiment of the present invention. In a more detailed description, FIG. 5A further illustrates a subsystem and method of the integrated wet-dry cap ingredient processing and delivery apparatus 40, with particular emphasis on apparatus function, and relating to the distinct advantages achieved through the shaftless spiral blending and delivery auger 54, used to performing multiple functions within the present system and methods as described in in FIG. 4A and FIG. 4B.

For an exemplary embodiment of the apparatus 40 specific to the augur in use, the apparatus 40 first receives the dewatered sand-slurry from shaker 20 and delivers the dry powder capping ingredients 31 to apparatus 40 by way of multiple ingredient feed tubes 41a and 43a corresponding to input ports 41 and 43, respectively, and further blending ingredients 31 with an added dewatered sand semi-slurry material added to apparatus 40 through input chute 21, and simultaneous to blending and delivery of the blended dry and semi-dry ingredients as a wet capping composition through processor blending screen 55, and thereafter delivering said composition to the spreading means 24 (including through composition output hopper 38 and composition conveyor belt 24 for delivery to the pool 28 as provided according to at least one embodiment of the present invention. The figure arrows represent the flow of multiple wet and dry ingredients and dewatered sand semi-slurry being processed, and when blended, the capping composition being conveying and delivery, with the flow indicated by arrows, in accordance with at least one embodiment of the present invention. The figure also depicts the apparatus integrating apparatus platform 61, augur housing 53, auger drive motor 41a, variable speed transmission and gearbox 41b, augur driveshaft 57, ingredient and slurry input ports 41 and 43, capping composition discharge opening 59 and the secondary processing and blending screen 55 elements of the apparatus.

FIG. 5B depicts a perspective view of the secondary blending screen 55 element of the integrated apparatus of FIG. 5A, used for further capping composition processing and delivery, with a focus on the wet composition flow-limiting internal screen structure, in accordance with at least one embodiment of the present invention. The blending screen is not considered to be limited to any particular mounting means or materials, only that the screen must be securing deployed and of a sufficiently strong material to withstand the rigors of commercial capping, as would be realized by those of skill in the art. Ideally, the screen 55 and related elements would be constructed of a strong metal from 55 and mesh 55b, as may be typically utilized in industrial applications known in the art and related to metal wire mesh screen for shale shakers and various vibrating sieves, as well woven metal mesh or wire structures of a suitable aperture size may be employed. In one embodiment, mining or 'filtering screen' may be used, is used for screening ore in extractive metallurgy, or mineral processing, also known as an ore dressing sieve. Further, crimped stainless steel mesh sifting sieves may be used for sizing coarse to small particles, as are used to separate commercial valuable minerals from their crude ores in other industries. In the instant application, experimentation was required to find the correct shape and aperture size and hence pass-through rate for the blending screen. As discussed, the selected static blending screen 55b aperture sizes chosen are considered. Smaller screen aperture 55b sizes have a tendency to slow the process but blend the output composition into finer gradations, as opposed to a larger screen aperture 55b sizes which has the tendency to quicken the delivery process and allow for the breakup of larger congealed clumps, or a "plasticizing" of the blended composition. Those of skill will recognize that the aperture size 55b will depend on the compositional output sought, but in general, the screen aperture opening size for a standard capping project may be about a 4 inch×4 inch square area, with any number of resulting aperture openings from just one (in the case of no screen 55 being affixed by blending screen attachment means 55a), or to a few large openings being utilized as aperture 55b, to many hundreds of smaller screen aperture 55b openings being contemplated. As relating to the ingredients that may be accommodated by the apparatus 30 and blending screen 55 combination, the amount and consistency of the materials are provided for guidance to those of skill in the arts. While the present embodiment of blending screen 55 addresses a 'static' or one size of aperture for the screen being used, it is further contemplated that aperture screen sizes may be modifiable, and that multiple size apertures may be used as multiple screens being changed on the site based on compositional needs, or multiple aperture sizes may be concurrently used. In another embodiment, it is believed that variable screen aperture sizes may be changed by hand or automation, or even adjusted based on the computerization of the blending system, to allow for various quick screen size aperture adjustments based on the compositions employed on the site.

To further clarify the apparatus 40 blender and screen 55 from the perspective of the ingredients being utilized, it is ideally contemplated that the ingredients be of a dry nature. However, as the sand ingredient is pre-processed, and as those of skill in the art will understand, the dewatering of sand allows for some small percent of water to remain in the 'dewatered' sand. Thus, the terms of use of 'wet', 'dry' 'semi-dry' and the like intend to allow for a certain understood range of what constitutes a 'dewatered sand slurry'. As further defined herein, the dewatering process may include any number of dewatering steps or apparatus. But in the present instance, if dewatering is used, the dewatering is limited to one step in the process in FIG. 4B, for example, as earlier recited in full in the '215 patent, and well known in the art as a dewatering shaker 40.

In one preferred embodiment of the present invention, by way of explanation, just prior to the start of the apparatus 40 process step 48, the wet sand slurry enters shaker 20, which includes a vibrating dewatering screen, and drains the sand of water, so as the sand passes through shaker 20, it will become more voided of most of its water and consequently take shape as a wet 'cake' or sand semi-slurry or semi 'dry' form as a sand ingredient, and with such consistency, thereby be discharged to apparatus intake chute 21 for blending with other dry ingredients 31. As the dewatered sand is discharged to blender chute 21, one or more separate ingredients are delivered through bins 41 and 43 and further through ingredient discharge tubes 41a and 43a, at which point the blending apparatus 40 will start the blending of the multiple ingredients into a resultant composition (through the action of augur 54) comprising multiple ingredients for discharge into hopper 38. While the dry or semi-dry ingredient input amounts prior to blending can vary widely and the present system can be scaled to process most any commercial batch size needed, in one embodiment, shaker 20 is capable of de-watering the slurry in excess of 200 tons per hour, based upon a screen measuring about 6 feet wide by about 16 feet long. The amounts of dry ingredients (for example, PAC and guar gum powder), as prototype tested (data not included), allowed the ingredient bins 41 and 43 to be 6 feet square, and contain more or less ton of dry ingredient at one time, being replenished from ingredient storage area 31 (by mechanical means such as loader 63, with operator guidance) as needed to maintain a consistent and coordinated ingredient flow with shaker 20. As taught in the '215 patent, the dewatered sand is discharged. However, in the present application embodiment, the sand discharge will now occur into a new blending apparatus 40, chute 21, as the sifted sand and the sifted water have been mostly separated through shaker 20. As taught in the '215 patent, the clean water may still be discharged within pool 28 by discharge line 22 where in reenters the local aqueous environment as clean water. The dewatered sand will thereby rolls off the end of the screen 20 into blending apparatus chute 21 where it will now be blended with other ingredients. As stated throughout, while exemplary delivery means is spreader 24 as located on the bow of the spreader barge 12, broadcasting the de-watered capping material in a uniform pattern, alternate delivery means of the capping composition are contemplated, in which the blended composition may be transported to other areas on-site, including by offloaded by bucket and fed into a secondary barge metering hopper for delivery.

To further describe FIGS. 4 and 4B illustrated steps 48, 49, 50 through which an integrated capping ingredient blending and delivery apparatus 40 in a FIG. 5A and FIG. 5B assembly 53, 55, 61 may interrelate with bulk ingredients 31 and dewatered sand discharge from 20 and inflowing at 21 in systemic and operational steps consistent with the present invention 10A. The apparatus assembly 53 and 55 together preferably comprises the system elements and operational steps like those illustrated in FIGS. 4 and/or 4B. However, it will be apparent to those skilled in the art that other blending and/or delivery technologies and steps may be removed or further integrated without departing from the scope of the present invention. And it will be apparent to those skilled in the art that optionally the apparatus 53, screen 55 or stand 61 may be separated and only one or the others may be used together or within the methods illustrated, and the apparatus 53 may be used elsewhere as a separate unit that achieves the same functions. In both FIGS. 4 and 4B 48-50 the steps may further comprise an integrated capping system when removed from the barge hull 12 platform as depicted in a non-limiting sense in FIGS. 1b, 2 and/or 3. FIG. 5 depicts a cross-sectional diagram of a non-limiting integrated blending and delivery apparatus of various embodiments of the invention. In this example, capping ingredients are stored and blended on-site and the resultant blended composition delivered as a novel cap layer. Large scale commercial ingredient blending systems and apparatus capable of handling bulk ingredient blending and storage and that include appropriate ingredient bin discharge bins and integrating stands, as being disclosed herein as a non-limiting example, are available as customized units from Flexicon Corporation, Bethlehem, Pennsylvania and Ingredient Masters, Inc., Batavia, Ohio.

FIG. 6A and FIG. 6B are views shown to generally illustrate the dramatic comparative difference in thickness of the subaqueous sediment cap layers. While the FIG. 6A multiple layer cap may also employ a PAC cap layer, to date, such delivery of a PAC cap layer has only been commercially achieved through using a pre-processed composite capping material as disclosed earlier in the background section while addressing the shortcoming of the capping composites. Because of the inherent problems in delivering very finely powdered and hydrophobic PAC through a dynamic water column 45 of any depth, greater amounts of the prior art composite PAC necessarily need to be employed to water surface 35 to ensure that the PAC powder reaches the riverway substrate bottom 37 at all, and even when the PAC does accumulate on bottom substrate 37, it often is not without creating a large amount of cloudy carbon turbidity in the water column 45. When contrasted with embodiments of the present invention in FIG. 6B, however, the point becomes clear that with embodiments of the present invention, a greater amount of PAC powder is able to transverse or passage the water column 45 under surface area 35 unimpeded by the natural and dynamic waterway flow, as was established in this case with in situ experimentation (experimental data with inventors). This indicates that less powdered ingredient (either PAC or the carrier, in this case guar gum), need be used to achieve a superior result over the composite art. This comparative result is believed to be due to both the PAC and carrier ingredient ratios that are employed in the blending process, and inherent factors in the guar gum powder, although the exact mechanism is not known. The blending ratio ranges employed and found the work in the testing of the PAC and guar gum powder compositional cap layer in the instant invention embodiments are show below in Table 1.

As further shown by the comparative FIG. 6A and FIG. 6B views illustrated, some comparative differences between a typical multi-layer industry remedial cap with a layer of larger commercial composites 61 (FIG. 6A), and a thin PAC cap layer 73 of embodiments of the present invention (FIG. 6B), as the layers are settled on substrate bottom 37. Capping layers may serve difference purposes, and include stone support layers, sand and gravel filter layers, chemical isolation and sealant layers, habitat growth layers, and variations of each, whereas, the cap layer 73 illustrates a single thin PAC semi-permeable layer.

The FIG. 6A cross section illustrates by rough size comparison the commercial capping composite products 61 described in the background art section of this disclosure with the novel PAC layer 73 in one embodiment of the present invention as disclosed herein. FIG. 6B illustrates for comparative purposes a singular PAC cap layer 73 as delivered with the guar gum delivery ingredient in one embodiment of the present invention. As the PAC-guar finely powdered ingredients being blended and delivered together ("PAC Layer", "PAC-based" layer and the like) demonstrated in initial product experiments, the guar gum powder acted as a delivery ingredient or vehicle for the PAC, and thus, up to 99% of the PAC surprisingly reached the riverway bottom substrate (tests results are privately held, but testing various capping ingredient ratios is disclosed herein). Generally, the thickness of a capping layer 61 or 73 can range from about 0.5 inches to about 9 inches, the thickness being dependent upon the sediment being capped and the capping ingredients and compositions being employed. Alternatively, however, the capping layer thickness with this invention embodiment can be decreased to be less than 0.5 inches or increased to be greater than 9 inches, as is disclosed in the '215 patent and known in the art, or, as in the present case embodiment, due to the very fine powders used in in conjunction with the small grained sand being employed, the thin cap layer 73 thickness was less than about 0.5 inches, but in other embodiments can be greater than about 12" inches, when multiple layers were employed. The water column 28 can be a general depth of 15'-25' feet or more on a waterway, but no specific depth is claimed in the instant matter. As shown just below in Table 1, selected ingredient ratios were employed for the different capping lanes and thus subsequent cap layers as summarized by Batch numbers 1-6 in Table 1 below. The processing of the ingredients at batches 1-5 were found to suitable passage the deep water column 45 in excess to the expectations of the testing crew and lab engineers, and successfully formed as independent thin cap layers 73 of remediating quality PAC at subaqueous substrate 37. The blended compositions in batches 1-5 had the consistency of sticky sand, but in the batches 1-5 tested not overly so. The batch number 6, as a quickly executed trial run, seemed to be the range that the composition was not as effective judging by the plasticizing consistency of the composition, and it was determined that while more testing was needed above that ratio, it is believed that higher ratios may be attainable with appropriate ingredient modifications. Composition samples taken from the conveyor prior to water surface delivery dropped onto the broadcast spinners at 24 and into the water very evenly dispersed at water column surface 35. Sample were also packaged for laboratory analysis, and the results, while not included herein, provided a clear analysis that the compositions readily maintained the PAC within. Other samples were testing in the laboratory setting, by hand dispersing the composition into a clear glass tube that simulated an actual water column, and this process determined that that the guar as a delivery ingredient brought the PAC through the beaker and adhering to the sand with a minimal column turbidity as experientially determined by eye.

TABLE 1

| Cap layer Batch No. | Ingredient 1 PAC fine dry powder (% added by total dry wt.) | Ingredient 2 Guar gum fine dry powder (% added by total dry wt.) |
| --- | --- | --- |
| Batch 1 | 0.3% | 0.3% |
| Batch 2 | 0.5% | 0.5% |
| Batch 3 | 1.0% | 0.5% |
| Batch 4 | 1.0% | 0.3% |
| Batch 5 | 1.0% | 0.1% |
| Batch 6 | 2.0% | 2.0% |

Based on the percentage of capping ingredient amount ratios depicted in Table 1, predetermined amount of dewatered sand semi-slurry was introduced into the FIG. 5A apparatus 40 dewatered through sand intake chute 21, first being dewatered according to known methods and the applicant's BCS® methods in the '215 patent, and using the available on-site ingredients of river water and bank sand, and, after dewatering in the suitable BCS capping system (as depicted in 10 or 10A herein), the further blending was made on the apparatus 40 with the addition of the Table 1 dry ingredients, with ratio gradations of selected of PAC and guar gum powder as shown, and as fed through ingredient feed ports 41a and 43a, which allow for the powdered and semi-dry sand to be blended and delivered together according the method of as a resultant composition, after full processing, to be output through the processor composition discharge port 59, through the static honeycomb blender 55, and to hopper 38 the conveyor belt 36 subsequent to delivery to water surface 35. Relative to the ingredients in Table 1, locally-sourced sand particles where used in the composition testing, as collected and processed on site, with the sand being first dewatered in shaker 20 and thereafter blended in apparatus 40 with the ingredients PAC and guar powder in the ingredient percentage ratios provided in Table 1. The dewatered sand as processed with the blended ingredients formed a resultant PAC based capping composition in the apparatus 40 that was estimated to between about 80% to 99% sand by weight. While the ingredient ratios in Table 1 are provided as exemplary, in various embodiments of the present invention wider sand ingredient ratios are contemplated. However, under the various Table 1 ingredient ratios as depicted, the ingredient sand in the FIG. 2 composition 71 was determined to passage the water column 45 with the other added ingredients, and having settled, formed as a substituent part within the PAC-based layer 73 on substrate 37 in FIG. 2 and FIG. 7 having 99% of the pre-blended PAC still within the formed waterway substrate layer 37 (unpublished experiment results not included). Thus, when the ingredient is being considered as a base ingredient is dewatered sand, consistent with the exemplary ingredient ratios tested, it is believed that the ratio of sand to the other ingredients being blended and delivered to be ideally between at least about 75%-99% by dry weight, but greater and lesser percentage ranges are contemplated, based on ingredients based ingredients employed, field conditions of the remediation site, and dewatering of the sand, and like parameters known in the art.

More particularly, while considered non-limiting, the cap layer 73 embodiment of the invention is the result of a system of FIG. 4A and process steps in FIG. 4B of blending and delivering a capping composition having at least one ingredient and suitable for use as a cap layer, the system and process steps including providing a dewatered sand dry-slurry comprising minimal water and a sand ingredient, the sand ingredient comprising between at least about 75% by weight sand and 99% by weight sand based on the total weight of the sand and other blended ingredients in the composition.

While the strength of any chemical or other binding is not understood, the PAC was observed to be attracted to the guar as a partial or temporal delivery agent, and thus advantageous as a dry ingredient capable of delivering the very fine PAC powder to a relatively deep (i.e. 15-25 feet, estimated) subaqueous waterway bottom substrate. If the inventors' hypothesis are correct, the temporary nature of the PAC-guar ingredient connection seems sufficient to deliver the PAC in a way that is viable from a delivery perspective, but upon delivery of the PAC to the bottom substrate 37, the guar shows through lab assessment to dissolve or incorporate into the local environment after the cap placement and over time, providing a source of nutrients to the subaqueous microbes. Thus, for remediation purposes, the remaining thin PAC-sand layer 73 presents an ideal improved sorbent cap composition 71 and layer 73. (see FIG. 2and FIG. 6B). Advantageously, the thinner and more uniform cap layer (or thin multiple PAC layers 73) may be used to achieve the same or better results as the comparative cap layers 61, having a greater efficiency of PAC passaging the thick water column being achieved, with a minimum of water cloudiness due to flow turbidity. As related to this present invention embodiment, the result makes the handling and placement of fewer ingredients and an integrated system a remarkably more efficient and much less costly solution than any previously known in the art. (see FIG. 6B). Further, high permeability of the present embodiment cap layer 73 also provides advantages. For way of an example explanation, the cap layer comprising a sorbent PAC ingredient coupled with the delivery guar ingredient provides advantages over a cap layer that is intended as a 'sealant' layer, which obstructs water flow through the cap layer by actively forming a physical or chemical barrier to 'seal' or 'block' the substrate 37 from the water column 45. In a non-limiting example, one advantage of a single or multiple layer cap comprising a sorbent PAC ingredient 31 coupled with the delivery guar ingredient 31 is that the guar serves to work with the sand particle ingredient blended from 21 to first deliver the PAC layer composition 71 to the desired subaqueous substrate 37 as a highly permeable cap layer 73, as taught throughout many embodiments herein. Additionally, as taught, the guar ingredient is further known to be a non-toxic organic micronutrient, serving as an active source of nutrient to the existing microbes that consume the guar being released from the PAC based layer 73 into the environment 45 by way of diffusion. This results is a gradual time and environmental dependent process delivers a more or less a pure PAC-sand layer 73 remediating the substrate 37, and over time, as this resultant layer is permeable as PAC is known in the art to be highly permeable. Further, this process is different from a cap layer 61 'sealant', for example, as the intentionally permeable PAC cap layer in one embodiment of the present invention allows water to flow through the layer and captures contaminates in the PAC that is combined with sand particles within the compositional layer 73. The waterflow being allowed through the toxic substrate layer 37 and through the porous PAC in the composition thus both tends to allow for the adsorbing and concentrating the hazardous contaminant within the cap layer 73, as intended, and also allow more guar being released to the environment 45 as a nutrient. The PAC layer cap 73 is thus an extremely useful product that remediates toxins and the environment in a highly useful manner. It is also contemplated herein that based on the ingredient ratio amounts blended and used to passage the resultant cap composition 71 to substrate 37, caps of greater or lesser permeability can be achieved depending on the intended purpose of the cap and project goals, and this flexibility in PAC layer designing will be apparent to those of skill in the art.

FIG. 7 is an elevated view of the broadcast capping system 10 and 10A of FIG. 1A/1B as depicted on the open waterway surface 35, and further depicting a capping delivery unit area 70, typical in the industry, and in accordance with at least one embodiment of the present invention. Relating further to FIG. 7, and as depicted on the open waterway surface 35 can be seen have the same capping area ("region", "zone" and the like) as that depicted in pool area 28, and further depicting the larger capping area units, which are individually capped by known means of multiple capping steps, rounds, lanes, and the like, and when combined can be seen as a total capping area 70, which may be any size known in the art, and for example being provided here as an overall capping area of about one acre or more comprised of smaller capping area units 70, and as used herein for the tested improvements disclosed, in accordance with at least one embodiment of the present invention, and having the barge hull control center 26 and the FIG. 4 and FIG. 4B capping steps (as also described in the applicant's '215 patent, incorporated herein for all that it teaches relating to the coordinated movement of template barge 14 and capping barge 12 along the waterway surface 35), as well as the disclosure herein. In one embodiment, the capping system is moved in accordance with the known conventional and walking spud 30 art, and seen in the figures, and further taught in the '215 patent, now being well known in the art. For example, examples of "walking spuds" for marine vessels are depicted in the art as well as within the '215 patent. One detailed teaching example disclosed herein is U.S. Pat. No. 10,287,748, "Dredge Walking Spud Apparatus", to Wetta, May 14, 2019 (the "748 patent"), assigned to DSC Dredge, LLC, of Reserve, Louisiana. The disclosure of this patent is hereby incorporated by reference herein for all that it teaches in the field of marine vessel-hull walking spud apparatus and systems. In the present case, and as discussed in the specification infra, the various hull and spud interface connections and all spud functions for the hull walking elements 30a and 30b being in various hull placement configurations as seen in the FIG. 8A legend and as used in the present invention can be found in the disclosures provided. In the instant application, the applicant herein was able use the '749 patent walking spud technology to create usable barge hull—spud configurations to allow for the vessel-hull configurations disclosed herein. The applicant further refined the walking spud elements to the present invention vessel walking embodiments in FIG. 8A-8J by using increased metal tolerances and durability, and retro-fitting the spud within its integrated system as described herein. More information related to various hull shapes that may be used in conjunction with the various walking spud configurations 30a and 30b are shown in FIG. 8A-FIG. 8J, disclosed below. Those of skill in the art will understand that the barges may be moved in accordance with other well-recognized movement means known in the art as well, by way of example, motorized winches involving cables in any workable configuration, tug, on-hull motors, and the like, as those of skill would know.

Figure 8A:
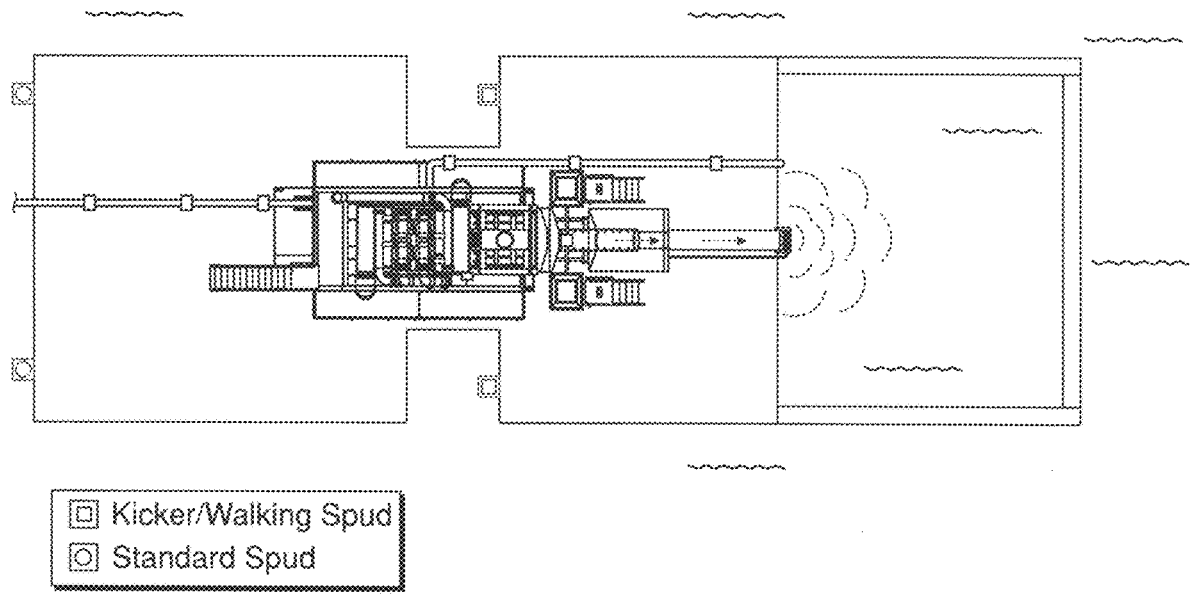
FIGS. 8A-8J depict elevated view perspectives of capping barge hull shape configurations.
Figure 8B:
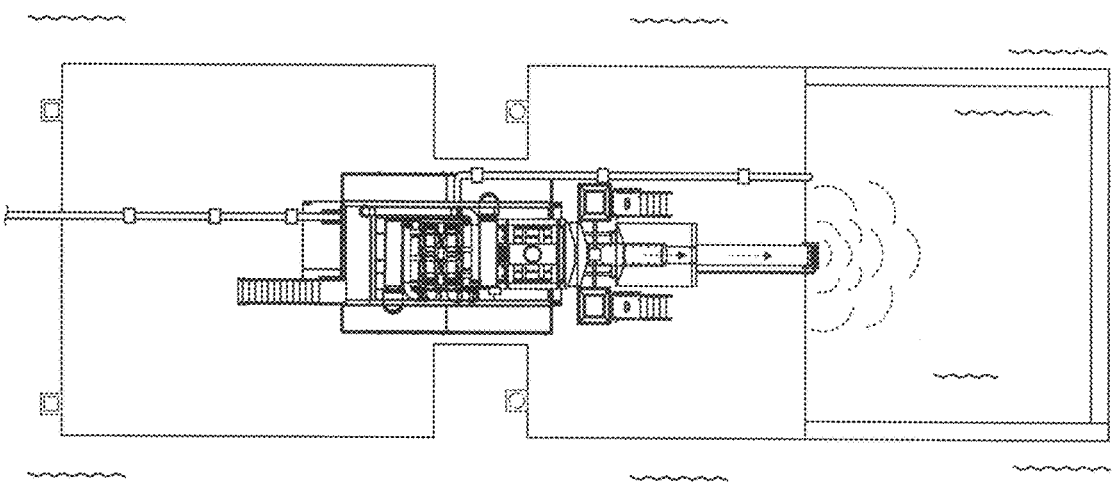
Figure 8C:
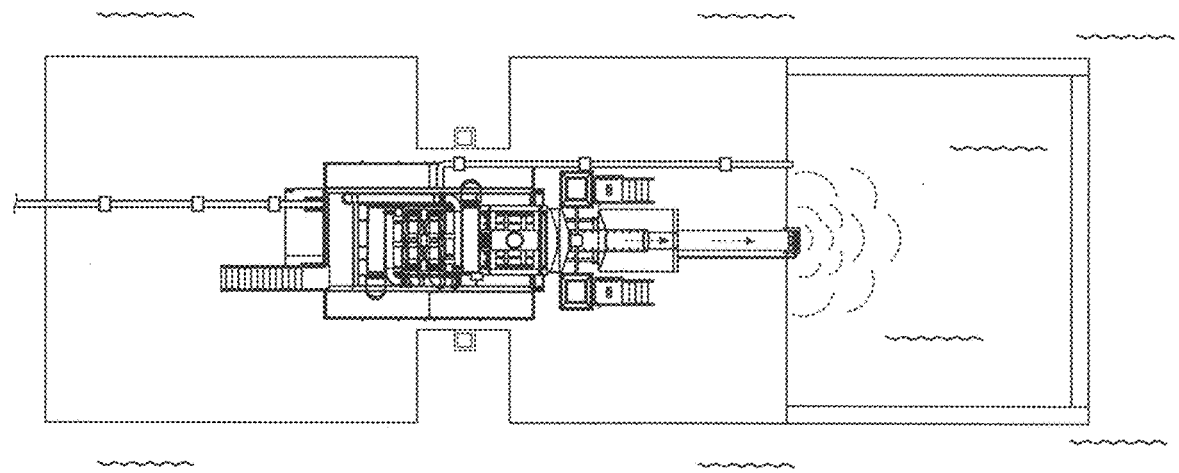
Figure 8D:
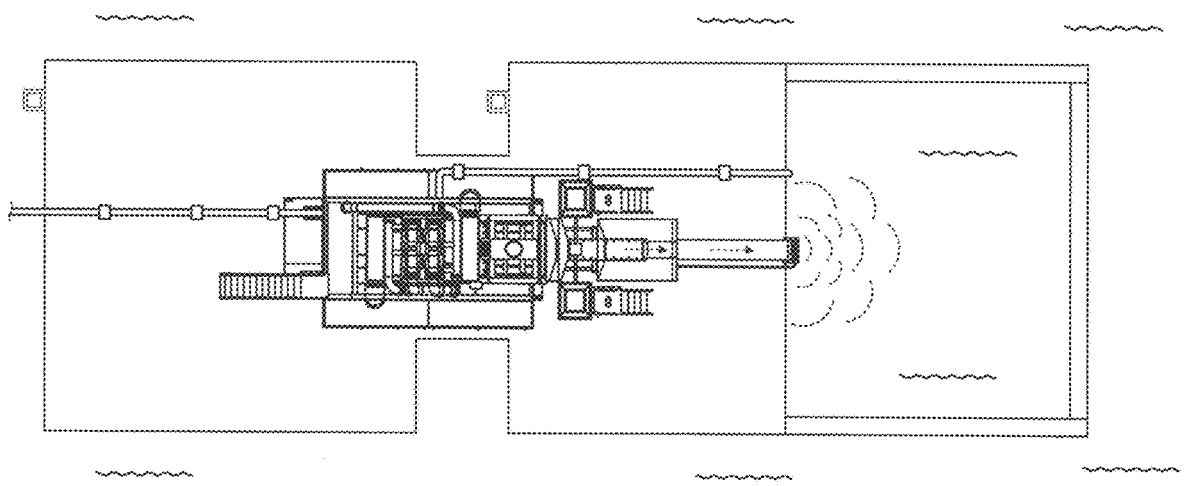
Figure 8E:
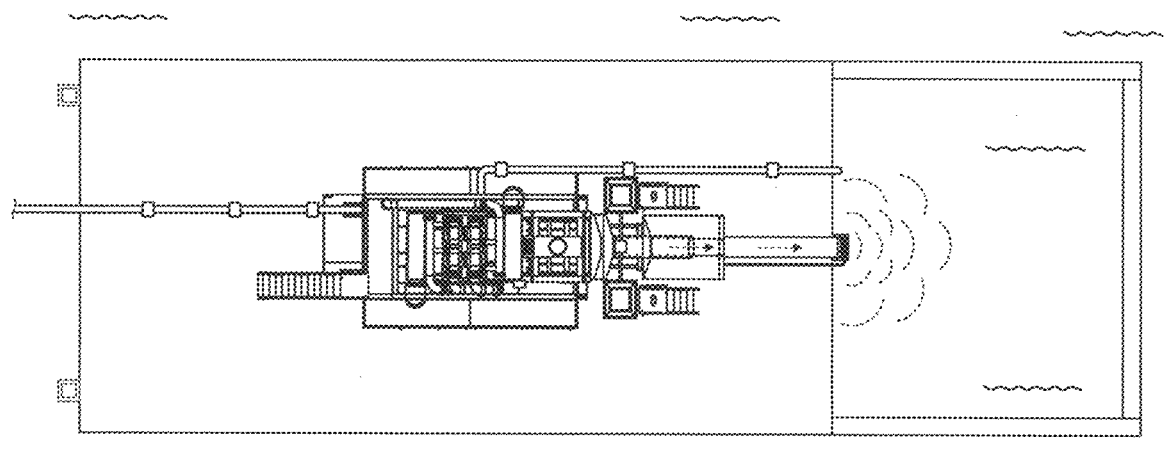
Figure 8F:
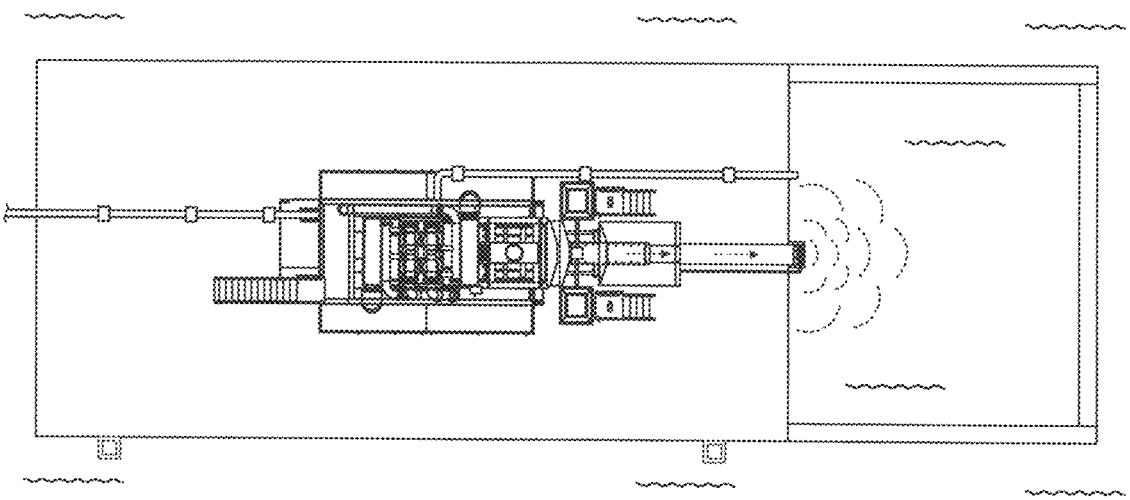
Figure 8G:
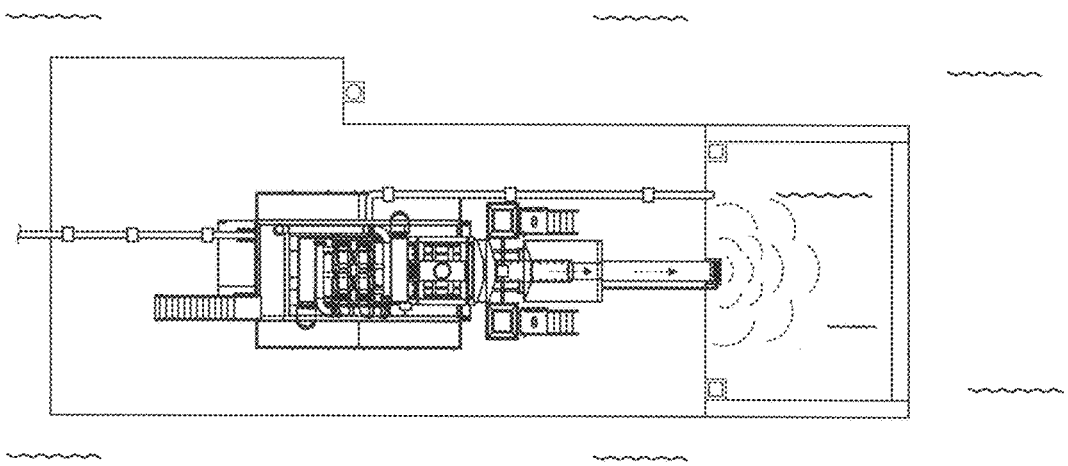
Figure 8H:
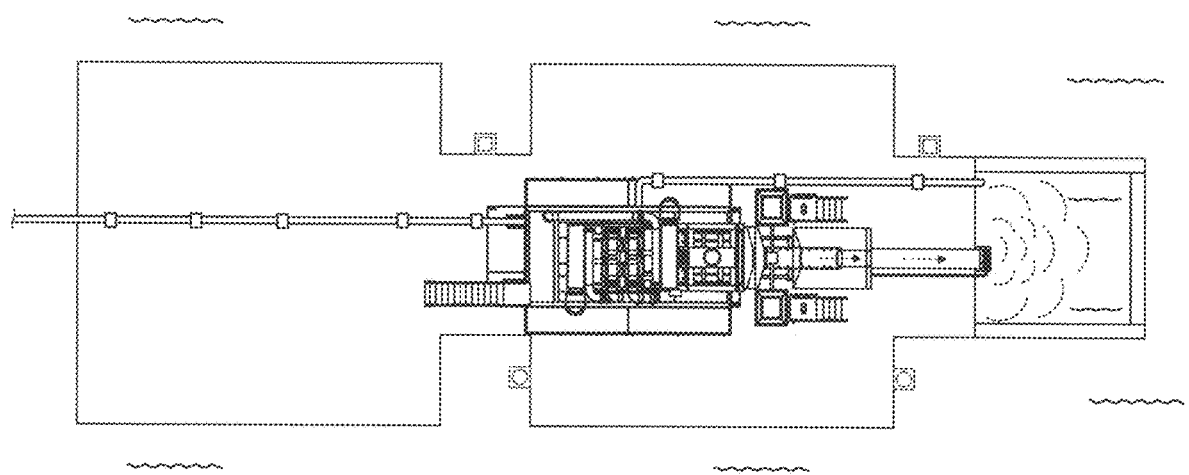
Figure 8I:
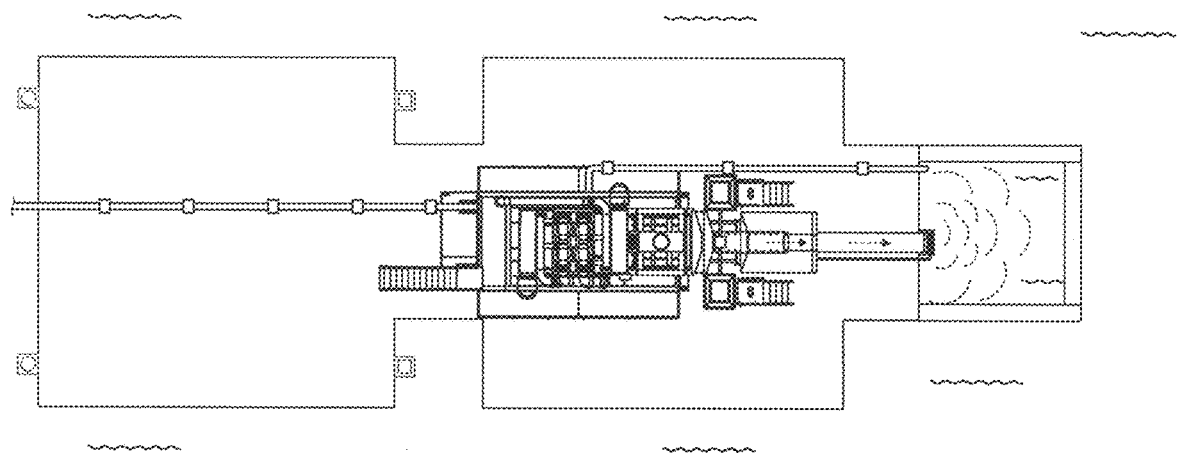
Figure 8J:
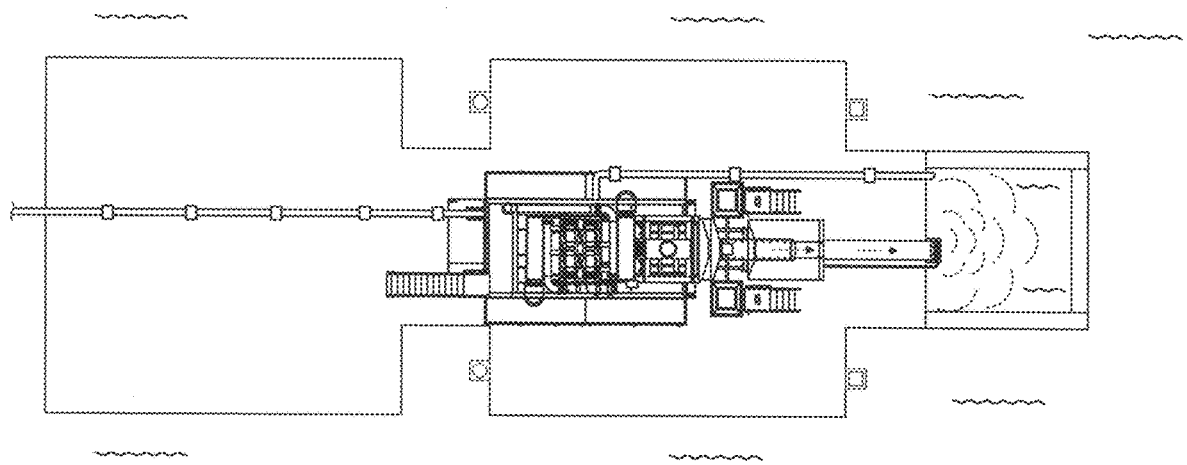

FIGS. 8A-8J represent elevated view perspectives of capping barge hull shape configurations, including the attachment positioning (see legend: kicker/walking spud 30a, conventional securing spud 30b) of the walking spuds as depicted in the FIG. 8A legend as either circle or square legend shapes, and as they relate to the various hull designs, and showing the placement of the spud types so they may be activated and used together to move the capping barge 12. FIG. 8A-FIG. 8J as disclosed contain material that is subject to copyright protection pursuant to 17 U.S.C. § 401, and the Vessel Hull Design Protection Act ("VHDPA"; 17 U.S.C. § 1301, et seq.). Now referring to 8A-8J as illustrating the vessel hull configurations A-L, and a non-limiting description of the movement of the barges 12 and 14 as related to the spud 30 elements. The spud elements described in earlier FIG. 2 and the present FIG. 8A legend, while not being limited, are typically referred to by the known spud types of "walking" or "kicker" spud type 3a and "standard" spud type 3b, as noted in the legend by either square (30a) or round (30b) shapes. While generally accepted that both spud types 30a and 30b may function as barge stabilizing legs, the spuds may additionally provide an additional both ambulatory function, or described in the 146 patent as "movement means" 34 to the capping barge 12 as another embodiment of the present invention. While contemplated as a movement means 30, it should be recognized that the same elements may provide hull stabilizing, and serve to be posted or securely affixed into the subaqueous flooring areas such as 37, and thus prevent barge movement based on water current. While outside the scope of any one patent application, and because spud types 30a and 30b are also provided herein as barge ambulatory elements, propelling the vessel movement in forward, backward, and at side-angled movements along the capping areas 35 within a larger capping area 70, the method of movement, even while recognized in the art, will be clarified in a general sense. For that purpose, various hull and spud interface connections and spud functions for the second movement means 30 elements of this patent are contemplated, and as used in the present invention, as discussed earlier, are disclosed in great detail in U.S. Pat. No. 10,287,748, "Dredge Walking Spud Apparatus", to Wetta, May 14, 2019, to assignee DSC Dredge, LLC, of Reserve, Louisiana (the "748 patent"). This patent is hereby incorporated by reference in its entirety for all that it teaches related further to barge hull and spud joining and barge movement technology as the barge movement is generated by multiple spud operating together and as related to the applicant's hull design embodiments of the present invention in FIG. 8A-FIG. 8J, and further related to barge capping methods on an open waterway capping area or region 35 as designated in FIG. 7. Through on-site testing, it was determined that the 'walking spud' equipment commercially sold by DSC Dredge, LLC, was not able to withstand the high stress of the Applicants' spud carriage hull attachment configurations. Thus, to remedy this mechanical shortcoming, the applicants thereby modified the hull-spud connecting configurations to render the spud technology taught in the '748 patent to be usable for the various vessel-hull configurations disclosed herein, including in FIG. 1B, FIG. 2, FIG. 7 and FIG. 8A through 8J. In doing so, the Applicant constructed appropriate spud-to-hull carriage connections of heavier metal tolerances, and through subsequent experimentation and use, discovered spud carriage-to-hull carriage metal tolerances that allowed at embodiments of the present invention to withstand the physical operation of the vessel-hull configured and described in FIG. 2, and as disclosed herein performed the capping operations disclosed within the on-site marine capping environment. Without being limited to other designs or uses, the spud carriage-hull connections disclosed in FIG. 2 are physically stable, functional and durable in terms of the material ability to withstand the heavy physical loads that are demanded by the large-scale capping process, as are the FIG. 8 spud carriage-hull connections believed to be. The elements 30a and 30b as movement means are both operated from the control center 26, by an operator typically working on the site, and may or may not include a computer within the operating parameters.

In order for the present invention embodiments to be more readily understood, certain terms and phrases are first defined below. Additional definitions for the following terms and other terms are set forth throughout the specification as appropriate. As used in the present disclosure and claims, the singular forms "a," "an," and "the" include plural forms unless the context clearly dictates otherwise. Wherever embodiments are described herein with the language "comprising," otherwise analogous embodiments described in terms of "consisting of" and/or "consisting essentially of" are also provided, and means that the embodiment may include additional steps, components, ingredients or the like, but only if the additional steps, components and/or ingredients do not materially alter the basic and novel characteristics of the claimed methods and compositions. The term "and/or" as used in a phrase such as "A and/or B" herein is intended to include "A and B", "A or B", "A", and "B".

As used herein, the term "adsorption" includes physical adsorption ("physisorption"), chemical adsorption ("chemisorption"), condensation onto a solid support, and combinations thereof.

As used herein, the term "average particle size" refers to the average diameter of the particle, e.g., number average of the major axis and minor axis.

As used herein, the term "approximately" or "about," in the present context, and as applied to one or more values of interest, refers to a value that is similar to a stated reference value. In certain embodiments, the term "approximately" or "about" refers to a range of values that fall within 25%, 20%, 19%, 18%, 17%, 16%, 15%, 14%, 13%, 12%, 11%, 10%, 9%, 8%, 7%, 6%, 5%, 4%, 3%, 2%, 1%, or less in either direction (greater than or less than) of the stated reference value unless otherwise stated or otherwise evident from the context (except where such number would exceed 100% of a possible value).

As used herein, remediation "site", or a "site in need of remediation" "remediation capping site" or "zone", depending on context, are intended to be used interchangeably and include aqueous capping project zones or surrounding areas adjacent to the cap "placement area" (FIG. 7, element 70) that have been polluted by hazardous toxic substances, and thus are hazardous to human and other life forms. The hazardous toxic substances are usually defined by various U.S. or foreign governmental agencies, such as, for example, the United States Environmental Protection Agency (US EPA), in addition to other conventional uses of the terminology. It is accepted that certain substances in the remediation sites (for example, certain polyfluoroalkyl ("PFAS") substances) found at the remediation sites can accumulate and stay in the human body for long periods of time. There is also evidence that exposure to a site or zone in need of remediation can lead to adverse health outcomes in humans, as both the US EPA and United States Food and Drug Administration (US FDA) have disclosed. Depending on the type of capping system and capping compositions used, the inventors further contemplate the definition to include any site or zone that may include both remediation of a "cap placement area" that is a underwater surface or terrestrial area, including intertidal zones and wetland or marsh areas, with a cap being placed, for example, by bucket, so that the addition of new growth may be added as a part of the remediation process.

The terminology "on-site", "in situ", "integrated" "one location", and the like in the present context refers to invention embodiments, that contain all the component elements within, or carried out, on a central job location or site in need of remediation. For example, as used herein, the terms may refer to an integrated improvement such as the system 10A, apparatus 40, ingredients 31 and compositional product 73 described herein, it means that the component elements are stored, used, processed or delivered locally, or on the remediation site premises, and this arrangement is contemplated whether the ingredient processor 40, capping ingredients 31 and capping compositions are used as physically mounted or carried on a barges 12 and 14, or on the land adjacent to the capping hull barge. To illustrate the conveying, broadcasting, processing and delivering of a capping ingredients and compositions from an open water barge 12 or on-land processing plant (not shown) to a cap placement area that can be a subaqueous substrate waterway bottom floor substrate 37 (be that waterway a river, inlet, canal, or ocean bottom in need of remediation), may include a partial subaqueous cap placement area, or even terrestrial cap placement area, the position of any invention embodiment component within the on-site physical environment will necessarily vary according to the specific features, terrain and geometry of the remediation site). At least one exemplary embodiment of the present invention allows for the processing and delivery of a capping composition from an on-site land plant, operating as a system not on an open water barge hull, but with the blending apparatus being operated from a land ("terrestrial") based or partial subaqueous environment adjacent to the capping site in need of remediation. Irrespective of the local placement of the cap processing equipment, the present integrated on-site system and embodiments allow for raw powdered capping ingredients to be stockpiled and processed within a semi-solid slurry, and delivered to the target substrate by any delivery means known in the art, whether delivered using the Brennan broadcasting system (BCS®) or a variety of other known composition delivery techniques and equipment, including for example, by bucket or known industry systems such as a Telebelt®, from Putzmeister America Inc., Sturtevant, Wisconsin, or Stone Slinger™, from W. K. Dahms Mfg. Ltd., Ontario, Canada.

Those of skill in the art would recognize that that the physical placement of the blending apparatus 40 may be used in various on-site job areas for different applications of a capping job. The characterization of any system or method differences between the respective on-board and/or on-land embodiments related to the positioning of the blending apparatus is that within the latter characterization or embodiment, the dry sand ingredient in that instance might need to be pre-conditioned with water in a hopper or other container prior to blending with dry ingredients. In one characterization, the adding of between 15% to 40% water to the sand prior to feeding the wet sand to an on-land conveyor belt for weighing and further moving the sand semi-slurry to the intake chute 21 of the blending and delivery apparatus 40, where the damp sand semi-slurry would at that time be blended with the dry powdered ingredients 31 that would be input through the apparatus intake 41 and 43 for blending the ingredients and delivering the resultant blended composition in any of the different manner as taught herein or known in the art, based on the context and project goal. Thus, the respective on-barge or on-land blending apparatus characterizations would be pre-planned based on the project, and whether the apparatus 40 is integrated directly into the applicant's BSC barge module or integrated as an on-land and on-site stand-alone blending and delivery sub-system to blend the ingredients, and thereafter either stockpile the resulting composition or deliver the resulting composition to the capping area by whatever appropriate delivery means, is decided on a job-specific basis.

Without deviating from the spirit of the embodiments within, an illustrative embodiment of the present invention can include the on-site and on-land storage and quality control of capping ingredients within the system or processes described, and may incorporate additional novel system elements that maintain standards and lower costs in the capping product, for example through cap or cap layer sample testing of the output capping composition as an integrated element of the system. By including ingredient storage and quality control testing being regulated on-site, costs related to shipping, testing, quality control and administrative functions are lowered for a capping remediation project. By way of further example, the inventors' contemplate that an "on-site" cap production system herein is a flexible system, which may be modified on-demand to adjust the capping ingredient amounts, concentrations or processing steps required. Thus, expensive powdered materials such as PAC, for example, or other delivery ingredients (i.e. guar gum powder) can be simultaneously protected on-site, quickly itemized and processed in one remediation site, and thereby allow for specific cap design adjustments and advantages based on dynamic real in situ conditions or variations. This flexible approach, when integrated with live quality control, allows the present flexible integrated invention to represent considerable advantages over the art. Shipping costs are lowered and shipping predictable, no capping composition material curing times are needed, and the final product cap product is of a higher quality. Given the complexities of modern environmental site toxins and sophisticated designs of capping systems in the modern remediation industry, the present integrated on-site system exceeds a predesigned or manufactured approach for a singular cap or product.

As used herein, the terms "delivery" or "delivering" is intended to include, but not limited to, "broadcast", "broadcasting", "providing", "conveying" "processing" and the like, of capping ingredients and capping compositions, as the terms may be represented in context through the systems, methods and apparatus embodiments of the disclosed invention herein. As will be appreciated in the present context, both wet or dry ingredient and composition delivery may be made by way of conveyor belt, augur or screw conveyor, pneumatic delivery, cable based delivery gravity input or discharge feeding, water column passage, for example. Both mobile and stationary integrated blending and delivery apparatus may be readily customized using interchangeable screws, conveyor tubes, drive motors, hoppers, flow-promotion devices, sensors, controllers, and other components to satisfy diverse end-use requirements. Large scale commercial ingredient blending systems and apparatus capable of handling bulk ingredient blending and storage and that include appropriate ingredient bin discharge bins and integrating stands, as being disclosed herein as a non-limiting example, are available as customized units from Flexicon Corporation, Bethlehem, Pennsylvania and Ingredient Masters, Inc., Batavia, Ohio.

As used herein, the term capping "slurry" refers broadly to a composition, blend, or mixture of sand, water and possibly other capping ingredients. A "dewatered" slurry refers to a slurry that is substantially free of water, and may also be referred to as a "semi-slurry", "dry slurry", "wet slurry", or the like terms as the context requires, without limiting the scope of any invention embodiment. For convenience in the present case, a sand slurry may comprise multiple slurry states, with these slurry states specifically referring to whether the capping sand slurry composition is handled prior to being dewatered at shaker 20, or after dewatering and discharging the dewatering slurry from shaker 20 for input into the apparatus 40 sand chute 21, and referred at that time as being a 'dewatered' or "wet" sand slurry. Many suitable dewatering systems are known in the art, and in the present invention, the shaker 20 and concubine 81, either alone or in conjunction, are used to dewater a slurry. In one embodiment of the present invention that is adequately disclosed and incorporated by reference as a sub-system and method step as used within the context of the inventions disclosed in U.S. Pat. No. 7,695,215, issued Apr. 13, 2010, which was incorporated by reference herein for all that it teaches in the field of subaqueous remediation, including in this case as related to the dewatering system and method step that is employed in the present invention, prior to the capping sand slurry being added to the novel improvement capping processor designated herein in FIG. 5A and FIG. 5B. In embodiments of the invention, subsequent to the dewatered slurry being discharged from shaker 20 to intake chute 21 of apparatus 40, the slurry ingredient will then be blended with one or more dry powdered ingredients as made available to the apparatus 40 at ports 41*a* and 43*a*, with the apparatus augur 54 and blending screen 55 being used as described through the resulting system and method steps as disclosed in FIG. 4A and FIG. 4B, and utilized to describe the processor 40 being used within the context of the ingredient blending and resulting composition delivery being prepared in a sequential manner as described such that a cap layer 73 to substrate 37 can be deployed.

The difference between the watered and dewatered slurry in the present invention relates to overall "wetness" of the sand slurry before being blended with the dry powdered capping ingredients and as processed into the resultant capping composition in blender 40. For example, in many embodiments herein, the "wet" sand slurry prior to being "dewatered" at dewatering means 20, and being inserted into the apparatus input chute 21 and subsequently blended with other ingredients on site, the sand slurry, having already been processed through a dewatering step prior to the system or method step 48 in the FIG. 4A and FIG. 4B, respectively. Thus according to embodiments of the invention, the water-sand slurry will have been dewatered through either through a hydrocyclone 81 and capping slurry shaker 20 to next be processed in apparatus 40 as a dewatered sand dry or "semi-slurry", as provided to apparatus intake chute 21, having been through one or more dewatering sub-systems 81 and 20 (one dewatering sub-system may operate independent of the other), and after dewatering, or, in some alternative embodiment, not being dewatered), and thus to being gravity fed into the processing apparatus chute 21 and processing apparatus 40 for blending, processing and delivery, and finally being deposited in the hopper 38. The point here being understood is that the dewatering steps are known in the art and earlier taught in the Brennen patent. However, in one alternative embodiment of the invention, the sand slurry will not be processed through a dewatering step, but merely processed as a dry sand ingredient, with added other dry ingredients as required, in apparatus 40 as a dry sand, as thus provided is some alternative embodiment, without dewatering and simply fed into the processing apparatus chute 21 of processing apparatus 40 for blending, processing and delivery of the dry sand with other dry ingredients to form a dry composition that can be stored and used for later purposes.

As earlier contemplated, Moving forward, after shaker 20 dewatering step, the powdered ingredients, for example, the PAC and guar gum powder, as one non-limiting example, are now also added to and are within the processing apparatus combined with the dewatered sand slurry, and the resultant semi-slurry capping composition material is processed and discharged at the process apparatus discharge port and static blender for final delivery to the site in need of remediation. In the present context, the sand slurry prior to dewatering usually comprises greater or lesser amounts of only water and silica particles, as has not yet been dewatered or further processed with added capping ingredients. In contrast, the dewatered sand semi-slurry composition will have formed, in this case comprising a semi-solid medium that has had most of its water removed, and which comprises smaller amounts of water and the same amount of silica particles. The medium will include fine silica solid ingredients, The slurry medium in this case may range from including partial water or no water at all, and delivered in conjunction with the same percentage of silica particles and no additional amount of the powdered ingredients yet added.

In one embodiment of the present invention, a dewatered sand slurry will now be combined with other ingredients, as described herein refers to a capping composition after being dewatered, as a composition of ingredients, and generally comprising water, silica, an activated carbon powder (e.g. "PAC") and an organic delivery ingredient (e.g. guar gum powder or "HGG") as being delivered from the processing apparatus as a semi-solid slurry to the top surface 35 of a natural water column over a subaqueous waterway zone in need of remediation. Used in this disclosure with slurry or the related terms "ingredient" "composition" "capping material" "amendment" and the like, in the present context refers to a capping composition or material processed and delivered to the capping placement areas 28, 35 and 70, depending on context, as a dewatered and semisolid slurry blend of ingredients, and this blend generally refers to, but is not limited to, a blend of fine particles of carbon powder, guar gum powder and fine sand particles being suspended in water. i.e., in this case, a "carbon, guar and sand-based slurry" 71 (FIG. 2). In accordance with another feature of the present invention, the method may further comprise that the dewatering of the sand slurry may include other processing through the use of various sand separators of filtration devices that are known and used in many industries. These may separate the solid sand particles from dirt or process water or liquids, as well as diluting and flocculating the composite slurry and then processing the composite slurry in a dewatering subsystem through shaker 20 and, whereby the sand slurry is delivered to the input port 21 of the cap processor 40, where in it further processed and mixed with the capping ingredients and delivered as one consistent to the conveyor 36 as a capping composition slurry and broadcast 24 to the water pool 28. It is contemplated that the dewatering process and sub-system herein may include any dewatering machine or equipment so long as the sand can be adequately delivered for blending with the dry capping powder ingredients in a consistent manner (e.g., by using shaker, hydrocyclone, belt press, screen, sieve, vacuum, filter, centrifuge or a combinations thereof). For one example, the pre-cap ingredient sand slurry is considered a semi wet slurry, and the sand particle sizes range of 25 to 2500 microns, and when drained of its free water (i.e., dewatered) to a wet cake or semi-slurry consistency. Suitable dewatering methods are known to those skilled in the art; see previously incorporated U.S. Pat. No. 7,695,215, issued Apr. 13, 2010, which was incorporated by reference herein for all that it teaches in the field of subaqueous remediation, including here case the dewatering step employed in the present invention prior to the sand discharge from shaker 20 and sand semi-slurry being blended in the processor 40 with the capping ingredients 31, 41a, 43a, as seen herein designated in FIG. 3 and FIG. 5A.

As used herein, "subaqueous capping system", while not being limited, is intended to refer to the capping system, with all of its explicit and implied elements, and which uses various capping methods which allow for one or more types of solid media capping materials or pre-blended ingredients to be blended, processed and delivered or conveyed as blended capping compositions or slurry over the top of one or more target subaqueous substrate zones 35 (also "capping zone", "capping area", and capping region"). The various elements of a subaqueous capping system embodiments are illustrated in the figures, descriptions, and claims herein, and in detail in FIG. 7.

The U.S. Environmental Protection Agency ("USEPA") defines in-situ "capping" as the placement of a subaqueous covering or "cap" of clean isolating material over an in-situ deposit of contaminated or harmful sediment. This capping process is also known as the "subaqueous remediation" or "sediment capping" of a given remediation site, zone or area that contains a contaminated or hazardous sediment. Those of skill in the art will recognize that many types of caps are used in the industry. For example, FIG. 6A herein graphically depicts the plurality of "cap layers" or "caps" that may be seen in the modern capping industry, and too many in number to enumerate, go under a variety of names and compositions, including "chemical" caps or chemical isolation layers (one novel example of a chemical cap would be the present invention "PAC layer" 73 shown in FIG. 6B), "Armor" cap or layer, "Chemical isolation" "Filter layer" "Habitat" "Growth" "Optional Armor" "Optional Filter" caps or layers, and almost all are used to cover contaminated or other sediment in a natural water column bottom substrate, although in a variety of ways, and serving a variety of functions. As these accepted terms are used herein, additional like terms are incorporated herewith, such as "cap layer" "layer" "capping material" "subaqueous cap" "remedial cap" "environmental cap" "broadcasting cap" "cap layer product" and the like, which are largely synonymously used herein, and in the present context refer to a composition, in a solid slurry form, comprising individual ingredients that are processed by a system and related apparatus to produce, when delivered, a cap covering or product that physically or chemically separates the subaqueous bottom substrate deposit of contaminated or harmful sediment from the natural water column above the substrate. In one use of the nomenclature as related to the present invention embodiments, the subaqueous cap layer slurry area 45 is created by using the disclosed integrated system and novel processing apparatus, and a novel capping composition is processed and delivered "on-site" "in position" "locally" "on the premises" "in place" "to the capping zone" "capping site" and the like, with the result to deliver the novel cap layer 73 to a process endpoint of the subaqueous substrate 37. FIG. 2 and FIG. 6 element 37 depict examples of the bottom substrate 37 endpoint referred to throughout this disclosure. In another embodiment, remediation capping may also be performed at a remediation site that does not contain an in-situ deposit of contaminated sediment, or in other cases, the deposit of contaminated sediment as already been capped. In that case, the 'capping' may be known as a "secondary remediation", using a term such as "habitat" "growth" or "optional" cap or layer in the sense that local plants may be introduced to the capped area in the attempt to complete a primary remediation of first capping the subaqueous contaminated sediments in that area.

As used herein, the terms "toxic", "contaminated" "harmful" and the like, are used in the context of, and refer to "contaminated sediments" and "hazardous or toxic substances" "polluting sediments" "toxic substances", and similar terms, and in context, refer to previously dumped or residual contaminants that are stored within or on any contaminated waterway subaqueous or terrestrial bottom substrate or floor, riverbed soil or "waterway bottom substrate" and the like (also related as a "contaminated site" "subaqueous sediment capping site" "remediation site", "site in need of remediation"), and are intended to mean, refer to, and include to cleaning up or remediation of any contaminating substance that is harmful or hazardous to human and other life, and for convenience, more fully defined as hazardous or toxic substances harmful to human or other life, and as listed under the Environmental Protection Agency ("EPA") definitions, including those added in the EPA's Toxin Release Inventory ("TRI") on a regular basis. The EPA definition includes such substances, for example, and without limitation, as contaminating residual polychlorinated biphenyl ("PCBs"), contaminating polycyclic aromatic hydrocarbon ("PAHs"), certain polyfluoroalkyl substances ("PFAS") substances, interrelated Perfluorobutane sulfonic acid ("PFBS") substances, being chemical members of PFAS, include a diverse class of synthetic chemicals, including perfluorooctanoic acid ("PFOA") substances, perfluorooctane sulfonic acid ("PFOS") substances, and the so-called GenX® technology and substances. Other known contaminating substances include, but are not limited to, pesticides, metals, volatile organic compounds ("VOC"), and semi-volatile organic compounds ("SVOC"). According to the EPA, examples of where PFAS contaminants can be found, prior to being dumped into the subaqueous environment (i.e., a "contaminated site" "remediation site" or "site in need of remediation") in cleaners, textiles, leather, paper and paints, fire-fighting foams, and wire insulation. GenX is a technology used to make high-performance fluoropolymers (e.g., some non-stick coatings) without the use of perfluorooctanoic acid (PFOA). Hexafluoropropylene oxide dimer acid ("HFPO-DA" or "GenX"), and its ammonium salt are major chemicals associated with the GenX technology. GenX chemicals have been found in contaminated sites, including sites associated with groundwater, drinking water, rainwater, and even in air emissions.

As used herein, the term "carbon", "Activated Carbon" ("AC") or "carbon-based" in embodiments of the present invention refers to a wide class of organic "adsorbing" ("adsorbing", "adsorption" "adsorb") ingredients, compositions, caps, cap layers, depending on context, and as used herein indicates classes and subclasses of capping ingredients with unique properties, such as carbon-based ingredients generally exhibit a large surface area, universal adsorption effect, high degree of surface reactivity, and different pore size. These qualities, it is believed by those of skill, allow the ingredient to adsorb wide range and types of individual molecules, atoms or ions to its surface. Those of skill in the art will understand that hundreds of activated carbons exist and are commonly known by such names as "Granular Activated Carbons" ("GAC"); Powdered Activated Carbons ("PAC"), "Extruded" or "Pelletized" Activated Carbons ("EAC"), acid-washed carbons, high-purity activated carbons and specialist-impregnated carbons, for example. Activated Carbon is also sometimes referred to in the art as "activated charcoal", and as is known, is a chemical form of graphite (much like the composition used for pencil leads), but differs primarily from pure graphite based on the random and highly porous surfaces having a broad range of pore sizes from cracks seen with the naked eye to the smallest molecular pore dimensions. The chemical structure within the composition gives the Activated Carbons the large surface area, allowing for the adsorbing of a wide but unpredictable range of compounds. The AT class is known to have the strongest physical adsorption force and highest volume of adsorbing porosity of any known material. For example, Activated Carbon can have a surface area of greater than 1000 $m^2/g$, which, when translated means 3 Grams of AT can have the surface area of a US football field, as a point of practical reference. In the context of embodiments within the present invention, the Activated Carbon term specifically includes "Powder Activated Carbon" ("PAC"), a processed and finely powdered reagglomerated bituminous coal-based material, as used herein, comprises an ingredient within a "PAC-based" composition, and is distinguished from "Granulated Activated Carbon" ("GAC") or "GAC-based" compositions, as GAC has a larger particle structure. However, these porous and surface area qualities described above give Activated Carbon its generally adsorbent characteristics, as mentioned. Contemplated within the "PAC-based" compositions as used herein, are such carbons that by size may be identifiable as carbon radioisotopes as described in the art as "carbon-based", "environmentally friendly carbon", "life-cycle carbon", "non-fossil fuel based carbon", "non-petroleum based carbon", "green carbon" and the like as the terms may be synonymously used herein. In the present application, characterizations of the "PAC-based composition" and "sorbent cap layer composition" of embodiments within are considered to be "environmentally friendly carbon", Thus, the present invention can be characterized as more natural and having less environmental impact than similar compositions that are petroleum based.

For embodiments of the present invention, carbon-based and non-carbon based adsorbing or absorbing ingredients are contemplated, depending on cap design circumstances. By example, a number of modified and powdered sodium bentonites (clays) are known in the art and contemplated as suitable adsorption ingredients, while not in the same class as that of activated carbons, that may be used in present invention embodiments in conjunction with various carbon-based ingredients. For example, various Organoclay™ tradename products may be employed, and are commercially available through Specialty Minerals Inc., with a main office located in Bethlehem, Pennsylvania. In the instant case, while not being limited to any particular type of adsorption, such as physisorption or chemisorption, the activated carbon is used as an ingredient in embodiments of the invention, and can be a part of a capping system, apparatus, composition, method, process or product of that process. For example, a "cap" or "capping layer" that includes an activated carbon, and specifically PAC, would as an embodiment of the invention that is active in adsorbing hazardous or toxic substances from within the polluted subaqueous or semi-aqueous, terrestrial waterway floor. As described herein, the PAC is used in one embodiment of the present invention as an adsorbing powder, and for the present invention is defined as a contaminant "adsorbing", contaminant "soaking" and contaminant "filtering" ingredient.

It is known by those of skill in the industry that PAC adsorbs contaminants in a shorter time period as compared with GAC, so PAC reaches its maximum adsorption capacity faster than GAC. While the workings are of PAC's higher capacity are not fully known, it is believed by those of skill in the art that PAC has a greater surface area compared with GAC, and therefore offers more surface area for the PAC and harmful sediment contact to take place. Up until the present invention, it was not known that PAC could be effectively delivered though an outside natural water column without creating an excessive amount of carbon on the water surface, due to the actual surface tension of water at the top, or surface, of the water column or the use of a manufactured composite. Unpublished experiments by the applicant (not included) in this regard showed that PAC, without another ingredient added, simply floats on the water surface, not breaking the water surface tension, and thus could not be used alone as a viable ingredient to serve as an effective subaqueous sediment cap. However, the on-site blending of various powders such as PAC and guar powder, has shown particularly good results through experimentation to allow the PAC to break the water column surface on a natural remediation site, in vivo, and thus vertically passage the natural water column and reach the bottom remediation substrate. The PAC powder employed in on-site treatability experiments as a capping ingredient in embodiments of the present invention is very fine bituminous coal-based PAC powder, known by the tradenames REMPAC or WPC, being commercially available from the Calgon Carbon Corporation, with a main location in Pittsburgh, Pennsylvania, and in this case, shipped as a very fine silt-sized powder having a powdered particle size of under 325 US Standard Sieve ("MESH") (i.e. under about 0.0018 inch, or under about 43 microns (43μ)), as determined by US MESH size, according to material specification sheets, and as often being confirmed by laser analysis testing.

For embodiments of the present invention, various PAC and guar gum combination dry ingredient ratios were experimentally tested and are depicted in Table 1 herein. It is understood that Table 1 ingredient ratios are provided as exemplary, and wider PAC ingredient ratios are contemplated and may be featured in different embodiments. However, using the invention embodiments as disclosed in FIGS. 1A-FIG. 7 as rendered, and under the various Table 1 ingredients and ingredient ratios as depicted, the environmentally safe ingredient PAC in the FIG. 2 composition 71 was determined to passage the water column 45, and having settled, formed a PAC-based layer 73 on substrate 37 in FIG. 2 and FIG. 6B. Experimental data further showed that over 99% of the blended PAC that was first blended with guar in apparatus 40 at step 48 of FIG. 4 and FIG. 4B, and delivered as a cap layer composition 71 in FIG. 2, was still within the formed waterway substrate layer 37 when tested in the laboratory, and based on core substrate 37 samples collected on the day of capping (unpublished experiment results not included), it was concluded based on the analyzed test data that the capping ingredients of PAC and guar gum powder blended with a sand as a base ingredient worked for the in situ delivery of a plurality of PAC-based cap layers. Specific thermal testing of the in situ study indicated that PAC was effectively delivered to the riverway bottom substrate 37, and as the PAC content of the apparatus 40 blend as measured in both pre- and post-delivery composition samples were found to be nearly equivalent, having only a 0.01% difference, on average, between the pre and post PAC amounts in the composition layer. This indicates that the guar gum appeared to effectively blend with the PAC and sand when used in conjunction with the applicant new blending system, and placed using the applicant's BCS® capping protocols as taught in the '215 patent. The inventors believe that based on this dramatic efficiency that was gained through the application of the PAC and guar gum ingredients, the guar gum could reduce the need to "overdose", or use too much ingredient (such as PAC), to capping layers to account for ingredient loss through the water column, which in turn could significantly reduce overall capping project costs, and thinner, more consistent cap layering.

As used herein, a number of technical or common use terms as used to refer to industrial or commercial grade "guar gum powder". As used in the present context, the terms "2-Hydroxypropyl guar gum", "hydroxypropyl guar gum", "guar gum" "guar powder" "guar" "HGG" "HPG" "GGP" and other guar gum-like materials, as defined herein, refer to an organic polymer ingredient, and herein commercially rendered and used as a powder in embodiments of the present invention. The guar gum powder used herein was purchased as M20V60 industrial grade guar gum powder, from Guar Resources LLC, of Brownfield, Texas, and Ingredi Company, Baltimore, Maryland (www.ingredi.com), having a powdered particle size of under 200 US Standard Sieve ("MESH") (i.e. under about 0.0030 inch, or 74 microns (74µ)).

This definition is intended to encompass both unmodified guar gums and modified guar gums, and generally refers to both nonionic and ionic guar gums. Unmodified nonionic guar gums are, for example, the products sold under the name Vidogum GH 175 by the company Unipectine and under the names Meypro-Guar 50 and Jaguar C by the company Rhodia Chimie. Modified nonionic guar gums are especially modified with C1-C6 hydroxyalkyl groups. Among the hydroxyalkyl groups that may be mentioned, for example, are hydroxymethyl, hydroxyethyl, hydroxypropyl and hydroxy butyl groups. These hydroxy alkylated guar gums are well known in the prior art and can be prepared, for example, by reacting corresponding alkene oxides such as, for example, propylene oxides, with the guar gum so as to obtain a guar gum modified with hydroxypropyl groups. The degree of guar gum hydroxy alkylation, which corresponds to the number of alkylene oxide molecules consumed by the number of free hydroxyl functions present on the guar gum, preferably ranges from 0.4 to 1.2, but need not be limited to those ranges. Further suitable unmodified and modified guar gum derivatives that may be used herein are disclosed to those skilled in the art; see U.S. Pat. No. 10,137,063 "Dye composition comprising nonionic guar gum or a nonionic derivative thereof, process and device for the same" to Charrier, et al., which is incorporated by reference herein for all that it teaches in the field of guar gum structure, relates to embodiments of the present invention as the guar gum ingredient may be employed with dewatered sand from shaker 20 and prior to blending with sand and PAC at processor 40. In embodiments of the present invention, the guar powder is used as an ingredient within the cap layer delivery system and used as an organic delivery ingredient or agent as guar gum powder, for example, when used in conjunction with other ingredients, such as powered activated carbon ("PAC"), and when used in the proper ratios with other ingredients such as PAC, water and sand particles, the powdered guar gum in this case serves as an organic polymer delivery ingredient or agent that promotes the settling and delivery of PAC through a natural water column in a time dependent manner. Meaning, tests have discovered that over time, the guar gum powder was reabsorbed from the cap into the local marine environment, while also believed to be consumed by benthic organisms as a food source. The low toxicity and safety of HGG in humans has been documented by the EPA in the publication "Inert Reassessment Document for Hydroxypropyl Guar Gum", EPA Case No. 39421-75-5 (2005). Those of skill in the art will recognize that while the definition of 'guar gum powder' is intended to contemplate other organic delivery ingredient powders, such as xanthan and zen gum powders, for example, in the context of the present invention. Other suitable ingredients contemplated by the inventors for delivery ingredients include, but are not limited to, the exemplary ingredients such as 1,2-dihydroxybenzene groups, polydopamine (PDA); polydopamine derivatives; derivatives of hydrocaffeic acid; poly (caffeic acid); tris (2-aminoethyl) amine (Tren) derivatives, including Tren-lysine-catechol (TLC), Tren-arginine-catechol (TAC), Tren-catechol (TC); poly-(3,4-dihydroxyphenethyl) methacrylamide-co-amino-ethylmethacrylamide; poly (dopamine methacrylamide-co-2-methoxyethyl acrylate)(p(DMAm-co-ME A)), and the like, or a combination comprising at least one of the foregoing. It is not intended to limit the type of cap ingredients or compositions used in the present inventions. Indeed, a variety of cap ingredients, compositions and ratios are contemplated. Furthermore, while guar gum powder has been determined by field testing and sophisticated laboratory testing to be functional, non-toxic and safe for the local organisms in a remediation capping site, other natural powders such as xanthan and zen gums are also contemplated herein, although have not been tested as to potential toxicity or impact that these ingredients may have on the local organisms living in a remediation capping site. When referring to the testing or disclosure of ingredients herein, including guar gum powder, for purposes of disclosure or scientific testing, percentage nomenclature reflected by percentages (%) associated with numerical amounts (e.g. HGG 5% 3%, 1% etc.), the amount referred to are considered amount in dry weights.

Various guar gum dry ingredient ratios were experimentally tested and are depicted in Table 1 herein. While the ingredient ratios in Table 1 are provided as exemplary, in various embodiments of the present invention wider guar gum ingredient ratios are contemplated. However, under the various Table 1 ingredient ratios as depicted, the environmentally safe ingredient guar gum in the FIG. 2 composition 71 was determined to passage the water column 45, and having settled, formed with the PAC ingredient a PAC-based layer 73 on substrate 37 in FIG. 2 and FIG. 7 having 99% of the pre-blended PAC still within the formed waterway substrate layer 37 (unpublished experiment results not included).

As used herein, the terms "sand" "silica" and "silicates" or the like in the present context are intended to comprise a non-organic granular material ingredient made up of very fine rock, crystal, or silica, and which is typically naturally occurring, finely divided rock, comprising individual particles, granules or grains of various size. For example, while not intending limitations to the present invention, courser beach sand particles or granules often range around the size of US Standard Sieve 28 ("28 MESH") (i.e., 0.028 inch, 700 microns); while the fine sand particles used in the invention embodiments herein often are within the 60-100 MESH particle size range (i.e., 0098-0.0059 inch, or 150-250 microns (µ), respectively). Various types of locally-available sand are used after dewatering as a carrier or granular particle ingredient in embodiments of the present invention. Representative larger capping ingredients are also sometimes contemplated in certain embodiments of the invention, and include but are not limited to larger sand particles, gravel, chipped stone, rocks, pebbles, commercial composites and other solid particulate or granular matter suitable for remedial capping. By example, larger granular capping ingredients typically range from about 0.1 millimeter to about 10 millimeter in size. FIG. 6A and FIG. 6B herein illustrate by cross sectional view some comparative differences between a typical multi-layer remedial cap with a layer of larger commercial composites 61 (FIG. 6A), and a thin PAC cap layer 73 of embodiments of the present invention (FIG. 6B), as the layers are settled on substrate bottom 37. Various dewatered sand ingredient ratios were experimentally tested and are depicted in Table 1 herein.

As used herein, "ingredient" or the like in the present context is intended to mean an element or various specific wet or dry material, in the singular, for example, PAC and guar gum ("HGG"), which can be blended together with any number of other ingredients, including sand, water, or other ingredients, to form a resultant "composition" "capping composition" or "amendment", that can be delivered, usually as a partially wet semi-slurry, but not always, to a remediation area. As used herein, "composition" and "amendment" are synonymous in the present context, and is intended to comprise the composition of various material ingredients mixed together. As further used herein, ingredient material may be comprised of very fine powders, or particles of organic or inorganic matter. The definition is intended to include sands, rocks and natural ingredients of most used sizes, and may include other suitable materials as well, including but not limited to clays and stones, as processed in situ. However, the term "composition" in the present context is not intended to include commercially available pre-mixed or pre-configured composite capping products made remote from the remediation site, such as, by way of example, SediMite® from Sediment Solutions, Endicott City, Maryland; Aquablok® from AquaBlok, Ltd., Toledo, Ohio, as these pre-made products do not offer the lower costs or logistic benefits of the capping compositions taught and claimed herein. For one example, Aquablok® needs to cure after mixing, which is time-consuming as opposed the short time period needed (i.e. seconds to minutes) to combine and deliver, without curing, the multiple cap ingredients which comprise and are delivered as the PAC composition embodiments claimed herein. However, it is intended that the composites described herein may be used as an ingredient that may be blended with other ingredients described herein, including carbon-based powders like PAC and GAC, and guar gum or other delivery agent powders.

As defined herein, the terms "powder", "fine" and "finely" powdered, in the present context, and while not intended to be limited to any particular powder particle size, are intended in the present a context to refer to capping ingredient particles having a US Standard Sieve ("MESH") particle size of about 200 to about 325 MESH, or, 74 microns (74µ), to under about 43 microns (43µ), respectively.

As used herein, the terms "shaker" "hydrocyclone" and the like are well known in the water separation, or 'dewatering' art, and are intended to refer herein to at least one apparatus or unit within the present capping system, or a step in the capping process, that is part of the sand slurry dewatering function at hydrocyclone 81 or lastly at shaker output 20, and the apparatus or devices both functioning to separating granular material ingredient from water, such as sand particles within a sand-water slurry based, and may be used to separate if needed based on sand particle size or weight. As the system and methods are configured herein, the sand slurry is dewatered before the shaker output 20 function or step, and prior to the sand slurry being input into apparatus input slurry chute 21, as depicted in FIG. 3 and FIG. 4A. The water that is removed from the wet sand slurry is recycled through the slurry water output 22.

In respect to one embodiment of the present capping system, the one or more hydrocyclone and related processes 81 are used in embodiments to separate sand particles from water according to particle granulometry, and may be achieved from larger to finer sand particle sizes, as needed, progressively by means of an element of a "centrifugal tridecantor", which is characterized by including successive hydrocyclone units or successive separation stages in the hydrocyclone sand-slurry dewatering process. Similarly, the shaker 20 dewatering function in embodiments may be freestanding and used with or without the hydrocyclone to separate the granular sand material from the water contained within the sand slurry, and as the separated water is evacuated through the slurry water output 22, the capping sand material is distributed from the shaker 20 into the ingredient processing chute 21 to be blended with one or more other capping ingredients and once blended, discharged into hopper 38, to conveyor belt 36 and through the spreading means 24 delivered to the pool 28. The dewatering technology and steps are fully described in the applicant's '215 patent, which is incorporated by reference herein for all that it teaches in the field of dewatering of the sand prior to the blending of the multiple ingredients in the on-site processer as seen in FIG. 4A and FIG. 4B.

The term "vessel" as shown in FIG. 1, and used herein refers to remediation capping barges 12 and 14 combined as one hull design, including the related integrated capping equipment and workers it carries while operating on the water surface. Vessel refers to every description of watercraft, unless otherwise defined, that is used or capable of being used as an integrated capping system 10A while floating or situated on water surface 35. Like terms include "spreader barge" "template barge" "floating tank" "spud apparatus" "platform" "staging platform" or the like, and all refer to a substantially flat-bottomed and flat-surfaced floating platform, and may include one or more sub-vessels. The vessel may be configured and used to carry capping equipment, supplies, materials and personnel, and allows for the on-site integrated capping of subaqueous hazardous sites, when used in conjunction with a "moon pool" 28 located within the vessel barge 12 and allow a capping composition broadcasting access 28 to a natural water column surface 35, and ultimately, passaging the water column 45 to the bottom substrate 37 for form the remediation cap layer 73. A vessel typically operates on a waterway surface, and in the present context, the vessel is designed to move on the water surface under its own power through the use of specially designed and powered walking spuds of two types, 30a and 30b, which work together to reposition the barge 12 and are further described herein. A vessel may also be moved with the aid of another vessel, typically a tug boat, but other movement means are contemplated as well, such as any number of cabling configurations known in the art, or the various walking spud configurations as shown herein.

The term "water column" or "natural water column" 45 as used in the present context refers to the naturally occurring cap composition "placement area" in a body of water located within a defined column area or zone from the surface of a body of water 35 to the water floor 37 directly below it, and includes the area within 45. In this context, "water column" includes any area within the top "water surface" area 35 as a part of an entire capping water surface 70, but excludes the waterway "bottom substrate" 37, which is also defined in the present context as the "hazardous waterbed" or the like, and is the targeted cap placement area for remediation as it contains the hazardous or polluted waste that has built up and is targeted to be capped by the present capping system 10A. A naturally occurring outdoor water column 45 often contains differences in physical and chemical properties at various depths and locations, and is considered the area in which the capping composition passaging occurs for any capping layer, including cap layer 73 as one embodiment of the invention.

The terms "capping composition distribution pool", "moon pool", "working pool", or "pool" are defined and used synonymously herein and refer to an opening in or around the barge-hull deck designated herein as 28 and which allows capping composition delivery access from composition spreading means 24, into the capping area water surface 35, and thereafter settling through the natural water column area 45 and finally resolving as a resultant subaqueous PAC cap layer 73 over the waterway substrate bottom 37. In alternative embodiments, any suitable form of composition delivery may be used. For instance, any variety of bucket used in conjunction with any heavy equipment may be used, such as a backhoe, for example, may deliver one or more processed capping composition loads to the water surface 35, or another terrestrial location in need of remediation. In yet other aspects, more exotic means of known capping composition delivery may be used, for instance, through the use of output hoses spraying directly over the water, or even a rotatable drum that distributes the composition trough a rotational means. The use of the distribution pool related to an embodiment of the present invention should be understood to be non-limiting in terms of being just one manner in which a composition may be delivered to a capping substrate. As is known in the art, other delivery methods are suitable, and may be used.

As used herein, the terms "settler", "settling ingredient", "delivery ingredient" "thickener", "amendment", and the like are used interchangeably and refer to any ingredient, such as sand, for example, used within a composition to effect a solid and liquid balance or stabilization of a "slurry", which may be known herein as a "wet" or "dry" slurry, "dewatered slurry", "partial slurry", "semi-slurry" and the like. In some embodiments, a delivery ingredient may be used as a capping ingredient mixed within the dewatered slurry, so to maintain the liquid state of the slurry for a period of time sufficient to allow solid portions of the slurry to be easily delivered through the capping processor apparatus, conveying belt and delivered by broadcast or other means to the water surface 35 so to settle downward (herein known as "underflow") separating away from the more liquid portion of the slurry (herein "overflow"), in a manner such that the capping composition passages through a water column, and thus allowing contaminated subaqueous sediments to be remediated while causing a minimal disturbance to the pre-existing sediment in the natural water column or over the natural water column bottom substrate. This definition is not intended to limit the type of delivery ingredient or agents used in the present inventions. Indeed, a variety of delivery ingredients and agent blending ratios are contemplated in the full range of the invention.

As used herein, "multiple layer" or "multiple pass" is intended to include one or more full deposit cycles of the material capping system over one particular capping zone. "capping zone" as used herein, is intended to include an area under the passing material "pool area". "Capping zone" and "pool area" are intended to be used interchangeably.

As used herein, the terms capping "zone" "area", "location", "cell" and the like refer to specific subaqueous grid or lane locations 35 intended to be subaqueously or terrestrially capped by one or more layers, delivered in batches, of the capping ingredients used in the FIG. 5 capping apparatus embodiments of the present invention. Capping area 35 shapes, designs, locations and configurations may or may not be square or rectangular and may occur both individually and in clusters 70, as illustrated in FIG. 7. Zone locations and configurations may use identical or varied capping materials and the same or variable cap layer thicknesses to achieve the remedial objectives of each specific zone cap.

As used herein, "planer" is intended to include the manipulation or movement of the vessel along its horizontal dimension in space relative to a three-dimensional orthogonal axis (e.g., x-y-z axis).

As used herein, the "operator" or "operation" of a "subaqueous capping vessel" or "subaqueous capping system" is intended to refer to the person or persons in control of the various vessel controls located primarily in control center 26, including, but not limited to the capping vessel 10A, aspects of the blending and delivery apparatus 40, with all of its explicit and implied elements and including capping and delivery apparatus 40 in FIG. 4A and FIG. 4B, and is also in control of executing the various capping functions or methods which allow for one or more types of solid media capping ingredients and compositions to be placed on the top of the target placement zones or areas. An operator may use one or more manual or computer adjustable controls located within or distant from the capping apparatus outside controls 41, to manipulate the apparatus movement, speed, screen control, or any other apparatus variables, in order to apply one or more types of solid capping ingredients or compositional layers on the top of the target subaqueous capping area 35 or areas 70, as the context may dictate.

It will be readily understood that the instant components, as generally described and illustrated in the figures and definitions above, may be arranged and designed in a wide variety of different configurations. Thus, the following detailed description of the embodiments of at least one of a system, apparatus, composition, and product made by a process, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", "other embodiments") or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

The present disclosure generally relates to, among other things, integrated and independent systems, methods, apparatus and compositional products for efficient, less costly and safe subaqueous capping remediation of a site in need of remediation using the subaqueous capping inventions taught herein. In particular, the present inventions provide systems, methods, apparatus and compositions for the delivery of remediating compositions to a site needing remediation.

Various aspects of the inventions are described in detail in the following sections. The use of sections is not meant to limit the inventions. Each section can apply to any aspect of the inventions in the context as described. In this application, the use of "or" means "and/or" unless stated otherwise. The use of singular words such as "a" and "an" in the specification and claims, unless otherwise stated, are intended to be considered plural in scope, and mean "one or more" unless a limit to the singular "one" is explicitly stated.

Various equivalents, changes and modifications to the specific embodiments of the inventions described herein will be apparent to those skilled in the art, or ascertained using no more than routine experimentation. Such equivalents, changes and modifications may be made without departing from the spirit and scope of the present invention and without diminishing its attendant advantages. Therefore, the appended claims are intended to cover such embodiment equivalents, changes and modifications, and are the sole limits on the scope of the invention.

What is claimed is:

1. An integrated apparatus for processing capping ingredients and delivering a capping composition on a subaqueous waterway bottom substrate comprising: a cylindrically elongated flow housing frame having a first and second ingredient feed port and a dewatered sand input chute; an axeless auger extending longitudinally through the frame with both ends affixed such that the auger is able to be rotated by a motor; wherein the auger simultaneously processes dry and semi-dry ingredients to form a blended capping composition and the composition is discharged through a discharge port to a blending screen under the port capable of further processing the composition prior to delivery to a metering hopper and conveyor belt sub-system; and a capping composition pool to deliver the composition through a water column such that it settles, creating a cap on the water bottom.

2. The integrated apparatus of claim 1, wherein the apparatus allows for the blending and delivery of a plurality of capping ingredients such that the resultant blended composition is a powdered activated carbon (PAC) cap layer.

* * * * *